United States Patent
Kemp, II et al.

(10) Patent No.: US 10,354,324 B2
(45) Date of Patent: *Jul. 16, 2019

(54) CLICK BASED TRADING WITH MARKET DEPTH DISPLAY

(71) Applicant: TRADING TECHNOLOGIES INTERNATIONAL, INC., Chicago, IL (US)

(72) Inventors: Gary Allan Kemp, II, Fairfax, CA (US); Jens-Uwe Schluetter, Lucerne (CH)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/190,319

(22) Filed: Feb. 26, 2014

(65) Prior Publication Data
US 2014/0180898 A1    Jun. 26, 2014

Related U.S. Application Data

(63) Continuation of application No. 11/415,189, filed on May 2, 2006, now Pat. No. 8,694,398, which is a
(Continued)

(51) Int. Cl.
*G06Q 40/00* (2012.01)
*G06Q 40/04* (2012.01)
*G06Q 40/06* (2012.01)

(52) U.S. Cl.
CPC ............. *G06Q 40/04* (2013.01); *G06Q 40/00* (2013.01); *G06Q 40/06* (2013.01)

(58) Field of Classification Search
CPC ......... G06Q 40/00; G06Q 40/02; G06Q 40/04
(Continued)

(56) References Cited

U.S. PATENT DOCUMENTS

| 1,760,287 | A | 5/1930 | Schippers |
| 3,792,462 | A | 2/1974 | Casey et al. |

(Continued)

FOREIGN PATENT DOCUMENTS

| CA | 2305736 A1 | 4/1999 |
| CN | 1216131 A | 5/1999 |

(Continued)

OTHER PUBLICATIONS

U.S. Appl. No. 10/403,881, filed Mar. 31, 2003, Schluetter, et al.
(Continued)

*Primary Examiner* — Ojo O Oyebisi
(74) *Attorney, Agent, or Firm* — McDonnell Boehnen Hulbert & Berghoff LLP

(57) ABSTRACT

A method and system for reducing the time it takes for a trader to place a trade when electronically trading commodities on an exchange, thus increasing the likelihood that the trader will have orders filled at desirable prices and quantities. Click based trading, as described herein and specifically the "Click" and "Dime" methods of the present invention, enables a trader to execute single mouse click trades for large volumes of commodities at a price within a pre-specified range.

22 Claims, 8 Drawing Sheets

Related U.S. Application Data continuation of application No. 11/061,554, filed on Feb. 18, 2005, now Pat. No. 7,505,932, which is a continuation of application No. 09/589,751, filed on Jun. 9, 2000, now Pat. No. 6,938,011.

(60) Provisional application No. 60/186,322, filed on Mar. 2, 2000.

(58) Field of Classification Search
USPC .................................................. 705/35–37
See application file for complete search history.

(56) References Cited

U.S. PATENT DOCUMENTS

| | | |
|---|---|---|
| 4,674,044 A | 6/1987 | Kalmus et al. |
| 4,750,135 A | 6/1988 | Boilen |
| 4,799,156 A | 1/1989 | Shavit et al. |
| 4,823,265 A | 4/1989 | Nelson |
| 4,903,201 A | 2/1990 | Wagner |
| 5,038,284 A | 8/1991 | Kramer |
| 5,077,665 A | 12/1991 | Silverman et al. |
| 5,101,353 A | 3/1992 | Lupien et al. |
| 5,136,501 A | 8/1992 | Silverman et al. |
| 5,146,591 A | 9/1992 | Bachman et al. |
| 5,168,446 A | 12/1992 | Wiseman |
| 5,243,331 A | 9/1993 | McCausland et al. |
| 5,245,535 A | 9/1993 | Weiss et al. |
| 5,249,300 A | 9/1993 | Bachman et al. |
| 5,263,134 A | 11/1993 | Paal et al. |
| 5,270,922 A | 12/1993 | Higgins |
| 5,297,031 A | 3/1994 | Gutterman et al. |
| 5,297,032 A | 3/1994 | Trojan et al. |
| 5,339,392 A | 8/1994 | Risberg et al. |
| 5,347,452 A | 9/1994 | Bay, Jr. |
| 5,373,055 A | 12/1994 | Togher et al. |
| 5,375,055 A | 12/1994 | Togher et al. |
| 5,414,809 A | 5/1995 | Hogan et al. |
| 5,454,104 A | 9/1995 | Steidlmayer et al. |
| 5,510,979 A | 4/1996 | Moderi et al. |
| 5,619,631 A | 4/1997 | Schott |
| 5,646,992 A | 7/1997 | Subler |
| 5,675,746 A | 10/1997 | Marshall |
| 5,682,489 A | 10/1997 | Harrow et al. |
| 5,689,651 A | 11/1997 | Lozman |
| 5,689,652 A | 11/1997 | Lupien et al. |
| 5,692,233 A | 11/1997 | Garman |
| 5,694,561 A | 12/1997 | Malamud et al. |
| 5,745,383 A | 4/1998 | Barber |
| 5,758,126 A | 5/1998 | Daniels et al. |
| 5,767,852 A | 6/1998 | Keller et al. |
| 5,768,158 A | 6/1998 | Adler et al. |
| 5,774,877 A | 6/1998 | Patterson, Jr. et al. |
| 5,774,878 A | 6/1998 | Marshall |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,844,572 A | 12/1998 | Schott |
| 5,845,266 A | 12/1998 | Lupien et al. |
| 5,873,071 A | 2/1999 | Ferstenberg et al. |
| 5,874,952 A | 2/1999 | Morgan |
| 5,915,245 A | 6/1999 | Patterson, Jr. et al. |
| 5,924,082 A | 7/1999 | Silverman et al. |
| 5,924,083 A | 7/1999 | Silverman et al. |
| 5,926,801 A | 7/1999 | Matsubara |
| 5,946,666 A | 8/1999 | Nevo et al. |
| 5,946,667 A | 8/1999 | Tull, Jr. et al. |
| 5,950,177 A | 9/1999 | Lupien et al. |
| 5,960,411 A | 9/1999 | Hartman et al. |
| 5,963,923 A | 10/1999 | Garber |
| 5,966,139 A | 10/1999 | Anupam et al. |
| 5,987,432 A | 11/1999 | Zusman et al. |
| 6,012,046 A | 1/2000 | Lupien et al. |
| 6,014,643 A * | 1/2000 | Minton .............. G06Q 20/102 705/26.4 |
| 6,035,287 A | 3/2000 | Stallaert et al. |
| 6,061,660 A | 5/2000 | Eggleston et al. |
| 6,064,985 A | 5/2000 | Anderson |
| 6,073,115 A | 6/2000 | Marshall |
| 6,073,119 A | 6/2000 | Bornemisza-Wahr et al. |
| 6,098,051 A | 8/2000 | Lupien et al. |
| 6,101,484 A | 8/2000 | Halbert et al. |
| 6,115,698 A | 9/2000 | Tuck et al. |
| 6,131,087 A | 10/2000 | Luke et al. |
| 6,134,535 A | 10/2000 | Belzberg |
| 6,161,098 A | 12/2000 | Wallman |
| 6,161,099 A | 12/2000 | Harrington et al. |
| 6,167,386 A | 12/2000 | Brown |
| 6,188,403 B1 | 2/2001 | Sacerdoti et al. |
| 6,195,647 B1 | 2/2001 | Martyn et al. |
| 6,211,873 B1 | 4/2001 | Moyer |
| 6,233,566 B1 | 5/2001 | Levine et al. |
| 6,272,474 B1 | 8/2001 | Garcia |
| 6,278,982 B1 | 8/2001 | Korhammer et al. |
| 6,282,521 B1 | 8/2001 | Howorka |
| 6,317,727 B1 | 11/2001 | May |
| 6,317,728 B1 | 11/2001 | Kane |
| 6,343,278 B1 | 1/2002 | Jain et al. |
| 6,366,293 B1 | 4/2002 | Hamilton et al. |
| 6,408,282 B1 | 6/2002 | Buist |
| 6,418,419 B1 | 7/2002 | Nieboer et al. |
| 6,421,653 B1 | 7/2002 | May et al. |
| 6,421,694 B1 | 7/2002 | Nawaz et al. |
| 6,493,682 B1 | 10/2002 | Horrigan et al. |
| 6,516,303 B1 | 2/2003 | Wallman |
| 6,519,574 B1 | 2/2003 | Wilton et al. |
| 6,553,346 B1 | 4/2003 | Walker et al. |
| 6,594,643 B1 | 7/2003 | Freeny, Jr. |
| 6,630,942 B2 | 10/2003 | Gerra et al. |
| 6,697,099 B2 | 2/2004 | Smith et al. |
| 6,766,304 B2 | 7/2004 | Kemp, II et al. |
| 6,772,132 B1 | 8/2004 | Kemp, II et al. |
| 6,826,553 B1 | 11/2004 | DaCosta et al. |
| 6,839,686 B1 | 1/2005 | Galant |
| 6,876,981 B1 | 4/2005 | Berckmans |
| 6,938,011 B1 | 8/2005 | Kemp, II et al. |
| 6,993,504 B1 | 1/2006 | Friesen et al. |
| 7,030,505 B2 | 4/2006 | Kimura |
| 7,082,410 B1 | 7/2006 | Anaya et al. |
| 7,124,424 B2 | 10/2006 | Gordon et al. |
| 7,127,424 B2 | 10/2006 | Kemp, II et al. |
| 7,155,410 B1 | 12/2006 | Woodmansey et al. |
| 7,171,386 B1 | 1/2007 | Raykhman |
| 7,177,833 B1 | 2/2007 | Marynowski et al. |
| 7,181,424 B1 | 2/2007 | Ketchum et al. |
| 7,181,425 B1 | 2/2007 | Cha |
| 7,209,896 B1 | 4/2007 | Serkin et al. |
| 7,212,999 B2 | 5/2007 | Friesen et al. |
| 7,228,289 B2 | 6/2007 | Brumfield et al. |
| 7,243,083 B2 | 7/2007 | Burns et al. |
| 7,305,361 B2 | 12/2007 | Otero et al. |
| 7,308,428 B1 | 12/2007 | Federspiel et al. |
| 7,356,498 B2 | 4/2008 | Kaminsky et al. |
| 7,389,264 B2 | 6/2008 | Kemp, II et al. |
| 7,389,268 B1 | 6/2008 | Kemp, II et al. |
| 7,401,046 B2 | 7/2008 | Hollerman et al. |
| 7,406,444 B2 | 7/2008 | Eng et al. |
| 7,412,416 B2 | 8/2008 | Friesen et al. |
| 7,415,671 B2 | 8/2008 | Sylor et al. |
| 7,418,422 B2 | 8/2008 | Burns |
| 7,428,506 B2 | 9/2008 | Waelbroeck et al. |
| 7,437,325 B2 | 10/2008 | Kemp, II et al. |
| 7,447,655 B2 | 11/2008 | Brumfield et al. |
| 7,496,535 B2 | 2/2009 | Otero et al. |
| 7,505,932 B2 | 3/2009 | Kemp, II et al. |
| 7,509,276 B2 | 3/2009 | Brumfield et al. |
| 7,509,283 B2 | 3/2009 | Friesen et al. |
| 7,512,561 B2 | 3/2009 | Burns |
| 7,533,056 B2 | 5/2009 | Friesen et al. |
| 7,562,038 B1 | 7/2009 | Brumfield et al. |
| 7,562,047 B2 | 7/2009 | Friesen et al. |
| 7,567,929 B2 | 7/2009 | Kemp, II et al. |
| 7,571,136 B2 | 8/2009 | May |
| 7,577,602 B2 | 8/2009 | Singer |

(56) References Cited

U.S. PATENT DOCUMENTS

| | | | |
|---|---|---|---|
| 7,577,607 B2 | 8/2009 | Singer | |
| 7,584,144 B2 | 9/2009 | Friesen et al. | |
| 7,587,357 B1 | 9/2009 | Buck | |
| 7,590,578 B2 | 9/2009 | Burns et al. | |
| 7,599,876 B1 * | 10/2009 | Lo | G06Q 40/04 705/37 |
| 7,613,649 B2 | 11/2009 | Brouwer | |
| 7,613,651 B1 | 11/2009 | Buck | |
| 7,636,683 B1 | 12/2009 | Mills et al. | |
| 7,650,305 B1 | 1/2010 | Tenorio | |
| 7,664,695 B2 | 2/2010 | Cutler | |
| 7,672,895 B2 | 3/2010 | Mintz et al. | |
| 7,676,411 B2 | 3/2010 | Kemp, II et al. | |
| 7,680,721 B2 | 3/2010 | Cutler | |
| 7,680,723 B2 | 3/2010 | Friesen et al. | |
| 7,680,724 B2 | 3/2010 | Brumfield et al. | |
| 7,685,055 B2 | 3/2010 | Brumfield et al. | |
| 7,693,768 B2 | 4/2010 | Kemp, II et al. | |
| 7,702,566 B2 | 4/2010 | Kemp, II et al. | |
| 7,707,086 B2 | 4/2010 | Burns et al. | |
| 7,720,742 B1 | 5/2010 | Mauro et al. | |
| 7,725,382 B2 | 5/2010 | Kemp, II et al. | |
| 7,752,122 B2 | 7/2010 | Friesen et al. | |
| 7,774,267 B2 | 8/2010 | Burns et al. | |
| 7,797,220 B2 | 9/2010 | McIntyre | |
| 7,813,991 B1 | 10/2010 | Keith | |
| 7,813,994 B1 | 10/2010 | Ebersole | |
| 7,813,996 B2 | 10/2010 | Kemp, II et al. | |
| 7,818,247 B2 | 10/2010 | Kemp, II et al. | |
| 7,870,056 B2 | 1/2011 | Ketchum et al. | |
| 7,882,015 B2 | 2/2011 | Waelbroeck et al. | |
| 7,890,414 B2 | 2/2011 | Brumfield et al. | |
| 7,904,374 B2 | 3/2011 | Kemp, II et al. | |
| 7,908,570 B2 | 3/2011 | Schluetter et al. | |
| 7,930,240 B1 | 4/2011 | Buck | |
| 8,019,665 B2 | 9/2011 | Hausman | |
| 8,060,434 B1 | 11/2011 | Mauro et al. | |
| 8,145,557 B2 | 3/2012 | Gilbert et al. | |
| 8,175,955 B2 | 5/2012 | Friesen et al. | |
| 8,185,467 B2 | 5/2012 | Friesen et al. | |
| 8,266,044 B2 | 9/2012 | Kaminsky et al. | |
| 8,275,696 B2 | 9/2012 | Buck | |
| 8,374,952 B2 | 2/2013 | Friesen et al. | |
| 8,442,890 B2 | 5/2013 | Brumfield et al. | |
| 8,612,333 B2 | 12/2013 | Kemp, II et al. | |
| 8,666,858 B2 | 3/2014 | Kemp, II et al. | |
| 8,666,872 B2 | 3/2014 | Burns et al. | |
| 8,688,564 B2 | 4/2014 | Friesen et al. | |
| 8,694,398 B2 | 4/2014 | Kemp, II et al. | |
| 8,738,497 B1 | 5/2014 | Schluetter et al. | |
| 8,756,148 B2 | 6/2014 | Friesen et al. | |
| 8,768,816 B2 | 7/2014 | Brumfield et al. | |
| 8,768,824 B2 | 7/2014 | Friesen et al. | |
| 8,831,988 B2 | 9/2014 | Buck | |
| 9,141,993 B2 | 9/2015 | Friesen et al. | |
| 9,189,815 B2 | 11/2015 | Friesen et al. | |
| 9,811,859 B2 | 11/2017 | Kemp et al. | |
| 9,830,654 B2 | 11/2017 | Buck | |
| 10,002,386 B2 | 6/2018 | Schluetter | |
| 10,037,567 B2 | 7/2018 | Kemp et al. | |
| 10,121,198 B2 | 11/2018 | Friesen et al. | |
| 10,147,138 B2 | 12/2018 | Friesen et al. | |
| 10,185,994 B2 | 1/2019 | Kemp, II et al. | |
| 2001/0034696 A1 | 10/2001 | McIntyre | |
| 2001/0039527 A1 | 11/2001 | Ordish et al. | |
| 2002/0023038 A1 | 2/2002 | Fritsch et al. | |
| 2002/0035534 A1 | 3/2002 | Buist et al. | |
| 2002/0038279 A1 | 3/2002 | Samuelson et al. | |
| 2002/0046146 A1 | 4/2002 | Otero et al. | |
| 2002/0046149 A1 | 4/2002 | Otero et al. | |
| 2002/0046151 A1 | 4/2002 | Otero et al. | |
| 2002/0046156 A1 | 4/2002 | Horn et al. | |
| 2002/0049661 A1 | 4/2002 | Otero et al. | |
| 2002/0055899 A1 | 5/2002 | Williams | |
| 2002/0059129 A1 | 5/2002 | Kemp et al. | |
| 2002/0073017 A1 | 6/2002 | Robertson | |
| 2002/0082967 A1 | 6/2002 | Kaminsky et al. | |
| 2002/0091611 A1 | 7/2002 | Minton | |
| 2002/0099636 A1 | 7/2002 | Narumo | |
| 2002/0099644 A1 | 7/2002 | Kemp, II et al. | |
| 2002/0116317 A1 | 8/2002 | May | |
| 2002/0120546 A1 | 8/2002 | Zajac | |
| 2002/0120551 A1 | 8/2002 | Jones | |
| 2002/0130868 A1 | 9/2002 | Smith | |
| 2002/0138390 A1 | 9/2002 | May | |
| 2002/0138401 A1 | 9/2002 | Allen et al. | |
| 2002/0161690 A1 | 10/2002 | McCarthy et al. | |
| 2002/0178096 A1 | 11/2002 | Marshall | |
| 2002/0184134 A1 | 12/2002 | Olsen et al. | |
| 2002/0194105 A1 | 12/2002 | Klein | |
| 2002/0198815 A1 | 12/2002 | Greifeld et al. | |
| 2002/0198816 A1 | 12/2002 | Gilbert et al. | |
| 2003/0004852 A1 | 1/2003 | Burns | |
| 2003/0004853 A1 | 1/2003 | Ram et al. | |
| 2003/0009411 A1 | 1/2003 | Ram et al. | |
| 2003/0023536 A1 | 1/2003 | Hollerman et al. | |
| 2003/0023542 A1 | 1/2003 | Kemp, II et al. | |
| 2003/0041000 A1 | 2/2003 | Zajac et al. | |
| 2003/0041006 A1 | 2/2003 | Bunda | |
| 2003/0065608 A1 | 4/2003 | Cutler | |
| 2003/0069834 A1 | 4/2003 | Cutler | |
| 2003/0083978 A1 | 5/2003 | Brouwer | |
| 2003/0097325 A1 | 5/2003 | Friesen et al. | |
| 2003/0126065 A1 | 7/2003 | Eng et al. | |
| 2003/0126068 A1 | 7/2003 | Hauk et al. | |
| 2003/0200167 A1 | 10/2003 | Kemp, II et al. | |
| 2003/0208424 A1 | 11/2003 | Tenorio | |
| 2003/0236737 A1 | 12/2003 | Kemp, II et al. | |
| 2004/0093300 A1 | 5/2004 | Burns | |
| 2004/0099933 A1 | 5/2004 | Kimura | |
| 2004/0103054 A1 | 5/2004 | Singer | |
| 2004/0117292 A1 | 6/2004 | Brumfield et al. | |
| 2005/0010520 A1 | 1/2005 | Dinwoodie | |
| 2005/0125328 A1 | 6/2005 | Schluetter | |
| 2005/0149429 A1 | 7/2005 | Kemp, II et al. | |
| 2005/0256799 A1 | 11/2005 | Warsaw et al. | |
| 2005/0262003 A1 | 11/2005 | Brumfield et al. | |
| 2006/0010066 A1 | 1/2006 | Rosenthal et al. | |
| 2006/0020538 A1 | 1/2006 | Ram et al. | |
| 2006/0059083 A1 | 3/2006 | Friesen et al. | |
| 2006/0167781 A1 | 7/2006 | Kemp, II et al. | |
| 2006/0195388 A1 | 8/2006 | Kemp, II et al. | |
| 2006/0195389 A1 | 8/2006 | Kemp, II et al. | |
| 2006/0200405 A1 | 9/2006 | Burns et al. | |
| 2006/0235787 A1 | 10/2006 | Burns et al. | |
| 2006/0259382 A1 | 11/2006 | Kemp, II et al. | |
| 2006/0259383 A1 | 11/2006 | Kemp, II et al. | |
| 2006/0259384 A1 | 11/2006 | Schluetter et al. | |
| 2006/0259404 A1 | 11/2006 | Brumfield et al. | |
| 2006/0259405 A1 | 11/2006 | Friesen et al. | |
| 2006/0259406 A1 | 11/2006 | Kemp, II et al. | |
| 2006/0259410 A1 | 11/2006 | Friesen et al. | |
| 2006/0259411 A1 | 11/2006 | Burns | |
| 2006/0259413 A1 | 11/2006 | Friesen et al. | |
| 2006/0265303 A1 | 11/2006 | Kemp, II et al. | |
| 2006/0265304 A1 | 11/2006 | Brumfield et al. | |
| 2006/0265305 A1 | 11/2006 | Schluetter et al. | |
| 2006/0265315 A1 | 11/2006 | Friesen et al. | |
| 2006/0265316 A1 | 11/2006 | Brumfield et al. | |
| 2006/0265318 A1 | 11/2006 | Friesen et al. | |
| 2006/0265319 A1 | 11/2006 | Friesen et al. | |
| 2006/0271475 A1 | 11/2006 | Brumfield et al. | |
| 2007/0038554 A1 | 2/2007 | Kemp, II et al. | |
| 2007/0038555 A1 | 2/2007 | Kemp, II et al. | |
| 2007/0038556 A1 | 2/2007 | Kemp, II et al. | |
| 2007/0038557 A1 | 2/2007 | Kemp, II et al. | |
| 2007/0118452 A1 | 5/2007 | Mather et al. | |
| 2007/0136182 A1 | 6/2007 | Ketchum et al. | |
| 2007/0244772 A1 | 10/2007 | Boesel | |
| 2008/0281669 A1 | 11/2008 | Pratt et al. | |
| 2009/0043664 A1 | 2/2009 | Lutnick et al. | |
| 2009/0076961 A1 | 3/2009 | Waelbroeck et al. | |
| 2009/0089196 A1 | 4/2009 | Friesen et al. | |
| 2009/0192933 A1 | 7/2009 | Singer et al. | |

(56) References Cited

U.S. PATENT DOCUMENTS

| | | |
|---|---|---|
| 2009/0307127 A1 | 12/2009 | Burns et al. |
| 2010/0005037 A1 | 1/2010 | Friesen et al. |
| 2010/0023443 A1 | 1/2010 | Tam |
| 2010/0070402 A1 | 3/2010 | Friesen et al. |
| 2010/0114751 A1 | 5/2010 | Busby et al. |
| 2010/0131427 A1 | 5/2010 | Monroe et al. |
| 2010/0138335 A1 | 6/2010 | Kemp, II et al. |
| 2010/0235273 A1 | 9/2010 | Friesen et al. |
| 2010/0312716 A1 | 12/2010 | Lane et al. |
| 2010/0332380 A1 | 12/2010 | Kemp, II et al. |
| 2011/0040674 A1 | 2/2011 | Tam |
| 2011/0153486 A1 | 6/2011 | Kemp, II et al. |
| 2011/0161223 A1 | 6/2011 | Buck |
| 2012/0078684 A1 | 3/2012 | Maciocci et al. |
| 2012/0084190 A1 | 4/2012 | Messina et al. |
| 2012/0239545 A1 | 9/2012 | Kemp, II et al. |
| 2012/0303513 A1 | 11/2012 | Buck |
| 2012/0317011 A1 | 12/2012 | Duquette |
| 2013/0124387 A1 | 5/2013 | Friesen et al. |
| 2013/0132265 A1 | 5/2013 | Brumfield et al. |
| 2013/0262289 A1 | 10/2013 | Friesen et al. |
| 2014/0081828 A1 | 3/2014 | Kemp, II et al. |
| 2014/0129413 A1 | 5/2014 | Kemp, II et al. |
| 2014/0180898 A1 | 6/2014 | Kemp, II et al. |
| 2014/0222652 A1 | 8/2014 | Friesen et al. |
| 2014/0229357 A1 | 8/2014 | Burns et al. |
| 2014/0229360 A1 | 8/2014 | Schluetter et al. |
| 2014/0249990 A1 | 9/2014 | Friesen et al. |
| 2014/0258079 A1 | 9/2014 | Brumfield et al. |
| 2014/0324665 A1 | 10/2014 | Kemp, II et al. |
| 2014/0351114 A1 | 11/2014 | Buck |
| 2015/0127509 A1 | 5/2015 | Studnitzer et al. |
| 2015/0356683 A1 | 12/2015 | Friesen et al. |
| 2015/0369623 A1 | 12/2015 | Blumenberg et al. |
| 2016/0035031 A1 | 2/2016 | Friesen et al. |
| 2016/0365072 A1 | 12/2016 | Blumenberg et al. |
| 2018/0012303 A1 | 1/2018 | Kemp, II et al. |
| 2018/0025426 A1 | 1/2018 | Buck |
| 2018/0268485 A1 | 9/2018 | Schluetter et al. |
| 2018/0308165 A1 | 10/2018 | Kemp et al. |
| 2019/0026831 A1 | 1/2019 | Friesen et al. |

FOREIGN PATENT DOCUMENTS

| | | |
|---|---|---|
| EP | 294187 A | 7/1988 |
| EP | 388162 A2 | 9/1990 |
| EP | 0702309 A1 | 3/1996 |
| EP | 1039405 A2 | 9/2000 |
| EP | 1067471 A | 1/2001 |
| EP | 1319211 B1 | 6/2003 |
| EP | 1462999 A2 | 9/2004 |
| GB | 2253081 A | 8/1992 |
| JP | 63177255 A | 7/1988 |
| JP | H03-505498 A | 11/1991 |
| JP | H04-291621 A | 10/1992 |
| JP | 4507159 A | 12/1992 |
| JP | H07-506916 A | 8/1993 |
| JP | 6028384 A | 2/1994 |
| JP | 6504152 A | 5/1994 |
| JP | H06236383 A | 8/1994 |
| JP | H08-315008 A | 11/1996 |
| JP | H10500788 A | 1/1998 |
| JP | 10247210 A | 9/1998 |
| JP | H10301870 A | 11/1998 |
| JP | 11-161717 A | 3/1999 |
| JP | H11-504455 A | 4/1999 |
| JP | 2000501864 A | 2/2000 |
| JP | 2001501333 A | 1/2001 |
| JP | 2004287819 A | 10/2004 |
| WO | 1990/10910 A1 | 9/1990 |
| WO | 1990/11571 A1 | 10/1990 |
| WO | 1991/14231 A1 | 9/1991 |
| WO | 1992/12488 A1 | 7/1992 |
| WO | 1993/15467 A1 | 8/1993 |
| WO | 1995/26005 A1 | 9/1995 |
| WO | 1996/34357 A1 | 10/1996 |
| WO | 1997/06492 A1 | 2/1997 |
| WO | 1997/10559 A1 | 3/1997 |
| WO | 1997/022072 A1 | 6/1997 |
| WO | 1997/45802 A1 | 12/1997 |
| WO | 1998/13778 A1 | 4/1998 |
| WO | 1998/49639 A1 | 11/1998 |
| WO | 1999/13424 A1 | 3/1999 |
| WO | 1999/19821 A1 | 4/1999 |
| WO | 1999/24945 A1 | 5/1999 |
| WO | 1999/30259 A1 | 6/1999 |
| WO | 1999/52077 A1 | 10/1999 |
| WO | 1999/53424 A1 | 10/1999 |
| WO | 2000/008581 A1 | 2/2000 |
| WO | 2000/016307 A1 | 3/2000 |
| WO | 2000/52619 A1 | 9/2000 |
| WO | 2000/62187 A2 | 10/2000 |
| WO | 2000/64176 A1 | 10/2000 |
| WO | 2000/65510 A1 | 11/2000 |
| WO | 2001/01077 A1 | 1/2001 |
| WO | 2001/02930 A2 | 1/2001 |
| WO | 2001/004813 A1 | 1/2001 |
| WO | 2001/008065 A1 | 2/2001 |
| WO | 2001/15000 A1 | 3/2001 |
| WO | 2001/16830 A1 | 3/2001 |
| WO | 2001/16852 A2 | 3/2001 |
| WO | 2001/16852 A8 | 3/2001 |
| WO | 2001/22266 A2 | 3/2001 |
| WO | 2001/22315 A2 | 3/2001 |
| WO | 2001/22315 A3 | 3/2001 |
| WO | 2001/27843 A1 | 4/2001 |
| WO | 2001/41280 A1 | 6/2001 |
| WO | 2001/54039 A2 | 7/2001 |
| WO | 2001/54039 A8 | 7/2001 |
| WO | 2001/63520 A1 | 8/2001 |
| WO | 2001/65403 A2 | 9/2001 |
| WO | 2001/71557 A2 | 9/2001 |
| WO | 2001/75733 A1 | 10/2001 |
| WO | 2001/88808 A1 | 11/2001 |
| WO | 2000/62187 A3 | 12/2001 |
| WO | 2002/015461 A2 | 2/2002 |
| WO | 2002/029686 A1 | 4/2002 |
| WO | 2002/033621 A1 | 4/2002 |
| WO | 2002/033623 A1 | 4/2002 |
| WO | 2002/033635 A1 | 4/2002 |
| WO | 2002/033636 A1 | 4/2002 |
| WO | 2002/033637 A1 | 4/2002 |
| WO | 2002/048945 A1 | 6/2002 |
| WO | 2002/059815 A1 | 8/2002 |
| WO | 2002/069226 A1 | 9/2002 |
| WO | 2002/079940 A2 | 10/2002 |
| WO | 2002/093325 A2 | 11/2002 |
| WO | 2002/103601 A1 | 12/2002 |
| WO | 2003/017062 A2 | 2/2003 |
| WO | 2003/090032 A2 | 10/2003 |
| WO | 2003/090032 A3 | 12/2003 |

OTHER PUBLICATIONS

U.S. Appl. No. 14/084,570, filed Nov. 19, 2013, Kemp II, et al.
"A System and Method for Conducting Security Transactions Over a Computer Network", Mauro & Buist, Mar. 1, 1999, DX 196, eS 066150-eS 066229, DTX 196.
A. Klein, WallStreet.com—Fat Cat Investing at the Click of a Mouse, Ch. 14-16, 18, and 23, 1998; Exhibit 16.
Allen, A., and Zarembo, L., "The Display Book: The NYSE Specialists' Electronic Workstation" in The Challenge of Information Technology for the Securities Markets: Liquidity, Volatility, and Global Trading, Eds. Henry C. Lucas Jr. and Robert A. Schwartz, p. 205-213, alleged available as of 1989, G0176623-G0176633.
Amazon.com Catapults Electronic Commerce to Next Level with Powerful New Features, Amazon.com Press Release, Sep. 23, 1997, DTX1034, DezmelykOOO012-13.
Annexes A and B of TT Reply Brief, received by European Patent Office on Oct. 3, 2006.
Apple Advertisement, Scientific American, Sep. 1984, Scientific American Inc. NY, NY DezmelykOOO014-33, DTX1035.

(56) References Cited

OTHER PUBLICATIONS

APT Trading Procedures (ATOM Version) of LIFFE, Apr. 3, 2001, Opposition EP 1 319211 B1 Exhibit 9B.
APT User Guide, 01/00/94, DX 152, LIFFE 000262-LIFFE 000363, DTX 152.
APT: A trading system for the future, The London International Financial Futures Exchange (LIFFE), 1990, 11 pages.
APTplus Trading Procedures, Dec. 28, 1995, Opposition EP 1 319211 B1 Exhibit 9D.
Aurora Chicago Board of Trade Brochure, 1990, ES0021230-ES0021241.
AURORA: The most technologically advanced trading system available today, Chicago Board of Trade, 1989, 11 pages.
Australian Patent Office Search and Examination Report for Singapore Patent Application No. 200405020-9 dated Aug. 2, 2007, dated Aug. 7, 2007.
Australian Patent Office Search Report in Singapore Application No. 200504224-7 dated May 8, 2008.
Automated Trader Journal, Q4 2007, alleged available as of Oct. 1, 2007, DDX_Buhannic 010.
Bernstein, J., Chapter 5: "Life on the Trading Floor," How the Futures Markets Work, New York Institute of Finance, 1989, pp. 62-67.
BNA, Inc. Securities Regulation & Law Report, "Possibility of 'After Hours' Trading Raises Liquidity, Other Concerns for SEC" vol. 31, No. 16, Apr. 23, 1999, ISSN 1522-8797 [Retrieved from the Internet at http://pubs.bna.com on Apr. 19, 2007], DDX 550.
Broker Workstation handwritten notes, alleged available as of Mar. 1, 1991, G0173819-0173920.
Building for Excellence, MINEX Brochure, DTX 1153, Silverman000330-Silverman000334, alleged available as of May 1, 1992.
Buist invoice to eSpeed, alleged available as of Feb. 8, 2006, PDX 955.
Cahier de charges.doc, Feb. 9, 1999, G0111752-G0111758.
Cavaletti, C., 'Order Routing,' Futures Magazine, Feb. 1997, pp. 68-70.
CBOT Broker Workstation Functional Specification, alleged available as of Mar. 6, 1991, G0173785-0173818.
Chart re DSM QA Test Plain—project plan in progress, DX 432, DTX 432, Nov. 4, 1998.
Chicago Mercantile Exchange (CME) Brochure, DTX1163, Silverman000406-Silverman000407, alleged available as of Feb. 1, 1997.
Chicago Mercantile Exchange, CUBS (CME Universal Broker Station) Brochure, alleged available as of Feb. 1, 1997, CME-E0000699-0000700.
Clemons, E., and Weber, B., "Alternative Securities Trading Systems: Tests and Regulatory Implications of the Adoption of Technology," Information Systems Research, vol. 7, No. 2, alleged available as of Jun. 1996, G0031593-0031618.
CME Group, CME Globex Access Directory, alleged available as of Jan. 1, 2008, G0137650-0137727, DDX_Buhannic 011.
Comparison of BTQPane.java files, alleged available as of Jun. 18, 1998, PDX 957.
Court's ruling on no prior sale dated Aug. 27, 2007.
CQG, LLC's and CQG, Inc.'s Initial Invalidity and Unenforceability Contentions, Civil Action No. 05-cv-4811, dated Jul. 23, 2012.
CQG's Final Invalidity Contentions, Case No. 05-cv-4811, dated May 10, 2013.
Credit Suisse First Boston, PrimeTrade promotional materials and press releases, alleged available as of Jan. 19, 1999, CSFB000036-000046, PDX_Buhannic 001.
Decision on Appeal issued by United States Court of Appeals for the Federal Circuit in *Trading Technologies International, Inc.* v. *Open E Cry, LLC*, Case 2012-1583, dated Aug. 30, 2013.
Declaration of Brendan Bradley in Case No. 04 C 5312, Nov. 18, 2004, 27 pages.
Declaration of Brian Schneider, Apr. 4, 2011, G0186079-0186081.
Declaration of Gregory Veselica, Mar. 30, 2011, G0186082-0186084.
Declaration of Thomas Cooper, Mar. 22, 2011, G0186076-0186078.
Declaration of W. Buist re: WIT DSM System, Apr. 26, 2006, PX 365, DTX 1777.
Declaration of Walter Buist, Exhibit 17, Apr. 26, 2006; with Faxed Signature Page.
Defendant GL Trade Americas, Inc's Supplemental Responses and Objections to Interrogatory Nos. 5,17, and 18,Jul. 24, 2006.
Deposition testimony of Amy Watson dated Jun. 12, 2007 with DDX 626A; DDX 700 and POX 636.
Deposition testimony of Atsushi Kawashima [4023] dated Nov. 21, 2005 with DDX 178-185.
Deposition testimony of Barbara Wattiez dated Jun. 16, 2007 with DDX 719-723.
Deposition testimony of Bautz, William dated Apr. 20, 2007 with DDX 550.
Deposition testimony of Bruno Spada dated Apr. 30, 2007 and May 2, 2007 with DDX 384-385; DDX 519-21; DDX 537-38; DDX 579-580; DDX 522; DDX 538; PDX 493-495; PDX 519-522.
Deposition testimony of Buhannic, Philippe dated Dec. 6, 2011 with DDX_Buhannic 001, 003, 004a, 006, 009, 010, 011, 013, 014, 015; PDX_Buhannic 001-002.
Deposition testimony of Buist, Walter dated Jun. 11, 2009 with PDX 950-955, 957-958; PDX 365.
Deposition testimony of Christopher Buist [7002] dated Jun. 22, 2006 with POX 358-364 and DDX 283-284.
Deposition testimony of Christopher Malo [6179] dated May 23, 2007 with DDX 524.
Deposition testimony of Cristina Dobson [5032] dated May 18, 2007 with DDX 625-635; DDX 637; POX 533 and POX 535.
Deposition testimony of Feltes, David dated Jan. 24, 2007 with PDX_Feltes 002.
Deposition testimony of Fred Mastro [6182] dated May 21, 2007 with DDX 638; POX 538; POX 540-543.
Deposition testimony of Greenstein, Mark dated Feb. 24, 2011 with DDX_Greenstein 003, 008.
Deposition testimony of Havard, Laurent dated Nov. 14, 2012; Errata dated Dec. 7, 2012.
Deposition testimony of Hiroyuki Kida [4002] dated May 17, 2007 and May 18, 2007 with DDX 617-624, POX 519-524 and POX 531.
Deposition testimony of Jean Cedric Jollant [6088] dated Apr. 26, 2007 and Jun. 13, 2007with DDX 384; DDX 517; DDX 520; DDX 551-568; DDX 575-577; PDX 465-483.
Deposition testimony of Josephine Sheng [6196] dated Jun. 26, 2007 with DDX 520; DDX 522; DDX 536; DDX 575; POX 493; POX 683-683a; POX 775.
Deposition testimony of Laurent Havard dated Apr. 24-26, 2007, May 12, 2007, Jun. 21, 2007 and Sep. 5, 2007 with DDX 506; DDX 508; DDX 517; DDX 539; DDX 551-568; DDX 570-573; DDX 575; DDX 603; POX 462; POX 464-483; POX 767769; POX 771-774; POX 875-877; POX 882-888 and POX 893.
Deposition testimony of Marc Lorin [6173] dated Sep. 5,2007 with DDX 385; DDX 721-722; DDX 730.
Deposition testimony of Marcel Tchitchiama dated May 10, 2007-May 11, 2007 with DDX 156-157; DDX 168; DDX 384-85; DDX 538; DDX 592-93A; DDX 595-98; DDX 602-06; DDX 608-11 DTX 494; POX 503; POX 506; POX 612.
Deposition testimony of McCausland, Robert dated Apr. 7, 2005 with DDX 111-114.
Deposition testimony of Michael Cartier [5022] dated May 9, 2007 with DDX 587-588; DDX 592-593A and POX 498-500.
Deposition testimony of Michael Glista [5049] dated Feb. 20, 2007 with DDX 382-386.
Deposition testimony of Neil Treloar dated Jun. 19, 2007 with DDX 384; DDX 539-39A; DDX 724; DDX 726; POX 492; POX 750-752.
Deposition testimony of Nicholas Garrow [5077] dated Jun. 14, 2007 with DDX 116 and DDX 592.
Deposition testimony of Peake, Junius dated Jun. 3, 2005 with DDX 121; Errata dated Jul. 26, 2005.
Deposition testimony of Philip Carre [4035] dated Jun. 22, 2007, Sep. 6, 2007 & Sep. 13, 2007 with DDX 384-385; 473;494; 527;537-541; 592; 593A; 595-598; 605; 626; 629; 719-723; 728-732; 897-898; 896.

(56) References Cited

OTHER PUBLICATIONS

Deposition testimony of Spada, Bruno dated Dec. 19, 2012.
Deposition testimony of Steiner, Erik dated Mar. 8, 2011 with DDX_Steiner 001, 003-005; Errata dated May 5, 2011.
Deposition testimony of Stengard, Mats dated Oct. 25, 2011 with DDX_Stengard001-003; Errata dated Nov. 25, 2011.
Deposition testimony of Villain, Michael dated Oct. 11, 2011 with DDX_Villain001, 002, 006, 011, 012.
Deposition testimony of Walter Buist [7013] dated Jun. 23, 2006 with DDX 315; POX 310-315; POX 365 and POX 368-370.
Deposition testimony of Wille, Mark dated Jun. 29, 2011 with DDX_Wille 002, 010, 011.
Deposition testimony of William McHorris [6192] dated Apr. 10, 2007 with POX 416-417.
Deposition testimony of Yarovsky, Tina dated Apr. 13, 2007 with DDX 474.
Deposition Transcript of Atsushi Kawashima [8021], Nov. 21, 2005, Opposition EP 1 319 211 B1 Exhibit 3.
Deposition Transcript of Paul MacGregor, Nov. 1, 2005, Opposition EP 1 319 211 B1 Exhibit 9A.
Deutsche Borse Group, DTB Member Manual Trading, Description of the Screens, Eurex 1.0/DTB 5.0 Version 01 May 11, 1998, E0000144-0000305.
Digital trading facility weekly operations meeting outline, DX 444, DTX 444, CM 006661, May 10, 1999.
Directory of Software Solutions for LIFFE Connect, 02/00/99, DX 156, DTX 156.
Directory of Software Solutions for LIFFE Connect, Issue 1, 10/00/1998, DX 155, DTX 155.
Directory of Software Solutions for LIFFE Connect, Issue 3, Jun. 10, 1999, DX 157, DTX 157.
Dow Jones & Reuters Factiva, 'Date Broadcasting Partners with Alltech Investment to Provide Customers with Online Trading', Feb. 25, 1999, E8.
Dow Jones & Reuters Factiva, 'Firms Rush to Make LIFFE Connect Decision', Dec. 4, 1998, E6.
Downes, J. and Goodman, J.E., Eds., Dictionary of Finance and Investment Terms, 5th Ed., Barron's Educational Series, Inc., 1998, p. 329.
Drawing of 1997 TSE terminal by H. Kida, DX 624, DTX 624.
DsmChanges.txt, alleged available as of Feb. 3, 2006, PDX 958.
Ecco Consulting Study Report MEFF Software Systems, Mar. 17, 1999, ES0060578-ES0060591.
Edo User Guide Release 1.10.1, The Global Order Routing and Order Execution System, alleged available as of May 7, 1997, G0049458-0049531, DDX_Buhannic 015.
Email from J. Damgard to FIA Board of Directors re FIA Subcommittee on Intellectual Property, alleged available as of Nov. 3, 2004, FIA0008, PDX_Buhannic 002.
Email from Patricia Gauthier to Sam Page, Jan. 25, 1999, G0119377-G0119380.
Email from Wattiez to M. Cartier attaching Matif VF: V4.50 manual, Mar. 30, 1998, DX 592, MC000046-MC000116, DTX 592.
English Translation of Tokyo Stock Exchange Offer Form, Apr. 18, 2005.
English Translation of Tokyo Stock Exchange, Orientation Materials for Participants, New Future Options Trading System, Produced on Feb. 5, 2007 by Defendant GL Consultants, Inc (GL) in civil proceeding 1:05-cv-04120 *Trading Technologies International, Inc. v. GL et al*, alleged available as of Sep. 1997, G0100319-0100355.
English Translation of Tokyo Stock Exchange, Orientation Materials for Participants, New Future Options Trading System, Produced on Oct. 29, 2010 by Defendant Rosenthal Collins Group, LLC (RCG) in civil proceeding 1:10-cv-00929 *Trading Technologies International, Inc. v. RCG*, alleged available as of Sep. 1997, RCG-TT0146811-0146830.
English Translation of TSE "Publication 1," Sep. 1997.
English Translation of TSE "Publication 2," Aug. 1998.
English Translation of TSE "Publication 3," Jul. 31, 2000.
English Translation of TSE Document 1, Jan. 2000.
EPO Comments to Opposition to European Patent EP 1319211 dated Dec. 1, 2010 (67 pages).
ESpeed and Ecco's Supplemental Answers to Plaintiff's First, Third, Seventh, Eighth, and Ninth Set of Interrogatories, May 25, 2007.
ESpeed's and Ecco's Answers to Plaintiff's Eighth Set of Interrogatories, Aug. 4, 2006.
ESpeed's Disclosure of Invalidity Contentions Pursuant to 35 USC 282, May 25, 2007.
ESpeed's Objections and Answers to Plaintiff's Third Set of Interrogatories to Defendant eSpeed, May 12, 2005.
ESpeed's Supplemental Invalidity Contentions, May 25, 2007.
ESpeed's Answers to TT's Eighth Set of Interrogatories, Interrogatory No. 22, Case No. 04 C 5312, dated Aug. 4, 2006.
Euro Servisen customers screen layout, hand drawn, alleged available as of Apr. 20, 2011, DDX_Gemon 001.
European Search Report for EP Application No. 04105905.6 dated Mar. 24, 2005, dated Apr. 1, 2005.
Evenstreet Presentation prepared for Flatiron Partners, 00/00/1999, DX 437, CM 007139-CM 007172, DTX 437.
Evenstreet Presentation prepared for National Discount Brokers, 00/00/1999, DX 301, CM 006787-CM 006817, DTX 301.
'Expanding Futures and Options Trading Around the World, Around the Clock,' GLOBEX, 1989, 48 pages.
Extended European Search Report in European Patent Application No. 10182713.7 dated May 25, 2011, dated Jun. 1, 2011.
Extended European Search Report in European Patent Application No. 10182744.2 dated Mar. 18, 2011, dated Mar. 25, 2011.
Extended European Search Report in European Patent Application No. 10182761.6 dated Apr. 8, 2011, dated Apr. 18, 2011.
Extended European Search Report in European Patent Application No. 10183926.4 dated Feb. 18, 2011.
Faxed German Document from Tick-It GmbH Filing New European Opposition, Jan. 13, 2006.
Fig. 2 Substitute Sheet (Rule 26), Opposition EP 1 319 211 B1 Exhibit 13A, Mar. 2, 2000.
Final Detailed Design Document NYMEX ACCESS, May 5, 1992, eSOOO3127-e5OOO3541.
Front Capital Systems AB, OPTRADE User Manual, Version 1.70, alleged available as of Jan. 1, 1991, G0175926-G0175955.
Functional Enhancements for LIFFE CONNECT for FUTURES Project, Mar. 3, 1999, G0119742-G0119745.
Functional Enhancements for LIFFE CONNECT for FUTURES Project, Apr. 12, 1999, G0119718-G0119724.
Functional Enhancements for LIFFE CONNECT for FUTURES Project, Apr. 12, 1999, G0119725-G0119732.
Futures/Options Trading System Guidelines for Operating the Trading Terminals, TSE Business Systems Dept., TSE00628-643, eS062278-eS062293, D1 (3), alleged available as of Aug. 1, 1998.
GATElab, webpage of product offerings, alleged available as of Jan. 1, 2011, DDX_Villain 012.
Geotext English Translation of Tokyo Stock Exchange, Futures/Options Trading System, Guidelines for Operating the Trading Terminals, alleged available as of Aug. 1, 1998, RCG-TT 0146831-RCG-TT 0146846.
German Document from Tick-IT GmbH Filing New European Opposition, Jan. 14, 2006.
GL and SunGard's Supplemental Objections and Responses to TT's Interrogatories, Case No. 05-cv-4120, dated Mar. 8, 2013, Redacted, Non-confidential portions only.
GL Brochure, G0021652-21658, alleged available as of Jan. 1, 1998.
GL Cost and Services, 00/00/1998, G0108876.
GL Enhancements Software Version 4.11 f, Oct. 29, 1998, G0060853-G0060854.
GL Enhancements Update, Jan. 27, 1999, G0101682-G0101688.
GL Product Leaflet Re: Mosaic, G0022529-22530, alleged available as of Jan. 1, 2001.
GL Trade Checklist-Installation Requirements for FUTURES, Jan. 1999, G0119795-G0119798.
GL Trade Presentation (French), Apr. 25, 1999, G0118989-G0119044.

(56) References Cited

OTHER PUBLICATIONS

GL Trade User Guide for Globex2, alleged available as of Apr. 1, 1999, CME-E0014287-0014489.
GL Trade, CAC and Stoxx Futures on MATIF NSC VF, User Information Notes, pp. 1-14, published by GL Trade, London, England, Mar. 15, 1999.
GL Trade, GL Win Version 4.50 Note d'information, alleged available as of Mar. 3, 1999, G0108715-0108751, DDX_Villain 006.
GL Trade, GLNEGO Version 4, alleged available as of Feb. 1, 1999, G0123387-0123447.
GL Trade, LIFFE Connect for Futures, User Guide v4.50, published by GL Trade, London, England, Feb. 1999, pp. 1-39.
GL Trade, LIFFE Connect for Futures, User Guide v4.50, published by GL Trade, London, England, Mar. 1999, pp. 1-39.
GL Trade, LIFFE Connect for Futures, User Guide v4.51, published by GL Trade, London, England, Jun. 1999, pp. 1-57.
GL Trade, LIFFE Connect for Futures, User Guide, v4.50 Beta, published by GL Trade, London, England, Jan. 1999, pp. 1-24.
GL Trade, Matif VF: V4.50, alleged available as of Mar. 30, 1999, G0123140-G0123209.
GL Trade, Note d'information d'utilisation de GLWIN pour le passage des futurs CAC et STOXX sur NSC VF (French-language document); Informational notice of use on GLWIN (with Trade Pad) re Stockwatch and GLNego equivalents, , alleged available as of Mar. 9, 1999, G0111620-G0111634.
GL Trade, User Guide V4.50, LIFFE Connect for Futures by GL Trade, alleged available as of Mar. 1999, G-RP0123448.
GL Trading Pad Manual, G0020819-G0020826, alleged available as of Aug. 12, 1999.
GL Version 4.70 (English Version), Jan. 5, 2000, G0020593-20621.
GL Version 4.70 (French Version), Jan. 5, 2000, G0026505-26533.
GL WIN and Related Software Manual, 2) G0025942-26267, alleged available as of Feb. 4, 1999.
GL WIN and Related Software Manual, 3) G010239-10610, alleged available as of Sep. 11, 2000.
GL WIN and Related Software Manual, Sep. 11, 2000, 1) G0025251-25615.
GL WIN et Logiciels complementaires (French), G0009495-9874, alleged available as of Sep. 11, 2000.
GL WIN et Logiciels complementaires (French), Jul. 1999, G0009875-G0010238.
GL WIN et Logiciels complementaires (French), Oct. 1999, G0009121-G0009486.
GL WIN Summary (French), Jun. 1998, G0091004-G0091046.
GL WIN Version 4.50, Mar. 3, 1999, DX 538, G 107459-G 107480, DTX 538.
GL WIN Version 4.51, G0118856-G0118865, alleged available as of Jun. 2, 1999.
GLOBEX Members Handbook, Jun. 1992, DX632, DTX632, eS0069744-eS0069818.
GLOBEX User Guide, Jan. 1997, DDX 633, DTX 633, Es0069819-eS0070081.
Great Britain Search Report in GB Application No. 0219306.8 dated Nov. 27, 2002.
Grummer, et al., 'Preliminary Feasibility Study,' Bermudex Ltd., Nov. 1980, 100 pages.
Handwritten diagram re INTEX screen, alleged available as of Apr. 7, 2005, DDX 112.
Handwritten document entitled pre '92 and post '92 with figures, alleged available as of Mar. 8, 2011, DDX_Steiner 003.
Handwritten document with drawing and figures, alleged available as of Mar. 8, 2011, DDX_Steiner 001.
Handwritten document with x's and lines, alleged available as of Feb. 24, 2011, DDX_Greenstein 003.
Handwritten document with XYZ and numbers, alleged available as of Mar. 8, 2011, DDX_Steiner 004.
Hansell, S., 'The Computer that Ate Chicago,' Institutional Investor, Feb. 1989, 5 pages.
Information Offer Form, Apr. 18, 2005.
Installation, Market Entry Test, and Technical Dress Rehearsal Summary, Feb. 23, 1999, G0119746-G0119750.
Interactive Brokers, 'Trade Futures Online with Interactive Brokers', May 9, 2005, eS0032571- eS0032572.
Internal Product News doc on QuickTrade, G0020468-20471, alleged available as of Jan. 1, 2001.
International Preliminary Examination Report on PCT Application No. PCT/US01/06792 dated Apr. 9, 2002, dated Apr. 12, 2002.
International Search Report in International Application No. PCT/US01/31222 dated Dec. 5, 2001.
International Search Report of International Application No. PCT/US2000/09369, dated Aug. 2, 2001 (dated Aug. 13, 2001).
International Search Report of International Application No. PCT/US2002/016865, dated Aug. 31, 2002 (dated Oct. 2, 2002).
International Search Report of International Application No. PCT/US2003/012201, dated Sep. 21, 2003 (dated Oct. 21, 2003).
Intex Project Specifications, alleged available as of Jul. 22, 1985, eS0024917-0024950, DDX 114.
INTEX, Functional Specifications, alleged available as of Aug. 1981, eS0003547-0003616, DDX 113.
Introducing the Company: GL Trade' product offerings and slide presentation (to Reuters), G0026534-26559, alleged available as of Jul. 26, 1999.
Invalidity Contentions Re: TradePad Module (Letter Dated May 25, 2007).
IRIS Investment Support Systems Window Ad, Opposition EP 1 319211 B1 Exhibit 10, Jun. 1, 1999.
Japanese Document, TSE00609-627, alleged available as of Sep. 1, 1997, with English Translation cited separately (RCG-TT0146811-0146830).
Java Island Book Viewer [online], 1999, 40 pages. [Retrieved on Jun. 11, 2009 from http://www.isld.com].
Keyboard example, Feb. 3, 2006, G007308-G007310.
Kharouf, J. and Cavaletti, C. "A Trading Room with a View," Futures, vol. 27, Nov. 1998, pp. 66-71.
Kharouf, Jim, "Exchanges Put on New Game Faces", Futures, Futures Magazine Group (US), Oct. 1998, vol. 27, No. 10, pp. 86-88, 92.
Kollock, P. "Market Morphing" Futures Industry Magazine, vol. 7, No. 7, p. 15-17, alleged available as of Oct. 11, 1997, G0116279-0116361, DDX_Villain 002.
Lehmann, B. and Modest, M., "Trading and Liquidity on the Tokyo Stock Exchange: A Bird's Eye View" [online], The Journal of Finance, The American Finance Association, 1994, vol. 49, No. 3, pp. 951-984. [Retrieved on Jan. 3, 2011] from the Internet: http://www.afajof.org/journal/jstabstract.asp?ref=11451.
Letter from EPO to TT Enclosing European Patent Oppositions [8015], dated Jan. 25, 2006.
Letter from EPO to TT Re: Five Recently Filed European Patent Oppositions [8014], dated Feb. 21, 2006.
Letter from EPO to TT Re: Further European Patent Opposition [8013], dated Feb. 23, 2006.
Letter from J. Walaski to the EPO Re: Change of Address, dated Dec. 19, 2006.
Letter from W. Buist to G. Fishman re tasks performed for TT project, alleged available as of Jun. 12, 2006, PDX 954.
Letter to EPO from Karl Barnfather Enclosing Notice of Opposition (form 2300.1) and Grounds of Opposition (Annex 1), dated Jan. 12, 2006.
Letter to J. Walaski from EPO Re: Decision to Grant TT Patent, dated Mar. 3, 2005.
Letter to J. Walaski from EPO Re: Payment, dated Apr. 20, 2005.
LIFFE CONNECT for Equity Options User Guide v4.30, Nov. 1998, G0119052-G0119086.
LIFFE CONNECT for Futures leaflet, G0023885-23888, alleged available as of Jan. 20, 1999.
LIFFE CONNECT for Futures Schedule for Project Deliverables, Feb. 4, 1999, G0119681-G0119682.
LIFFE CONNECT for Futures User Guide v4.5, 6/00/1999, G0025751-25806.
LIFFE CONNECT for Futures: Project Summary: Apr. 19, 1999, G0119705-G0119717.

(56) References Cited

OTHER PUBLICATIONS

LIFFE CONNECT for Futures: Project Update 2, Meeting of Feb. 10, 1999, G0119698-G0119704.
LIFFE CONNECT for Futures-Project Update 1, Meeting of Jan. 11, 1999, G0119691-G0119697.
LIFFE CONNECT Futures Functional Technical Issues to Resolve, Apr. 12, 2007, G0119049-G0119050.
LIFFE Connect Futures Release Note 050399.doc, Mar. 3, 1998, G0111402-G0111407.
LIFFE CONNECT ISV Circular No. 001.99, Jan. 15, 1999, G0119617-G0119618.
LIFFE CONNECT ISV Circular No. 001.99, Jan. 8, 1999, G0119566-G0119568.
LIFFE CONNECT ISV Circular No. 004.99, Jan. 15, 1999, G119615-G0119616.
LIFFE CONNECT ISV Circular No. 008.98, Dec. 28, 1998, G0119631-G0119632.
LIFFE CONNECT ISV Circular No. 14.99, Mar. 2, 1999, G0119583-G0119590.
LIFFE guide/pamphlet, DX 148, DTX 148, alleged available as of Jan. 1, 1994.
LIFFE, The Application Program Interface (API) Reference Manual for LIFFE Connect, Release 3.1, alleged available as of Sep. 1998, G0023004-0023068.
LIFFE's New Electronic Trading Platform for Futures, LIFFE 202-261, Opposition EP 1319211 B1 Exhibit 8D, Sep. 24, 1998.
Marion, L. "The paperless exchange" Institutional Investor, vol. 20, No. 4, black and white, alleged available as of Apr. 1986, DDX_Steiner 005.
Marion, L. "The paperless exchange" Institutional Investor, vol. 20, No. 4, color, alleged available as of Apr. 1986, G0157750-0157755, DDX_Wille 002.
Market Watch Trading Screen, 2000, 1 page.
Mauro, U.S. Appl. No. 09/292,552, filed Apr. 15, 1999, DX 209, eS 065994-eS 066149.
Meeting outline, DX 428, CM 00750-CM 007501, DTX 428, Sep. 11, 1998.
MEFF Renta Fija Manual, DTX 1165, 10/00/1997, SilvermanOO0410-SilverrnanOO0473.
Megumi Miyoshi, Japanese Patent Application No. 20010564025, Apr. 18, 2000 (published as JP2004504652) (English translation provided).
Member Participation in the Futures Market, Apr. 12, 1999, G0119196-G0119197.
Memo Re: Downloading the Terminal Program, Aug. 18, 2005.
Memo Re: Dual ACCESS Version 4.5 release, Mar. 21, 1999, G0022956-G0022959.
Memo Re: Futures/Options Trading System and Japanese Patent Application No. 2001-564025 (Japanese), Aug. 18, 2005.
Memo to Distribution from R. McCausland re: Open Spread Development; Memo to E. Brian from McCausland re: The Full INTEX Network & Trading System Components, M1-M17, alleged available as of May 29, 1984, DDX 111.
Memorandum Opinion and Order issued by Judge James B. Moran in Case 1:05-cv-04088, *Rosenthal Collins Group, LLC,* vs. *Trading Technologies International, Inc.*, May 16, 2007, PDX 950.
Memorandum Opinion and Order issued by Judge Virginia M. Kendall in *Trading Technologies International, Inc.* v. *BCG Partners, Inc.*, Case 1:10-cv-00715, dated Feb. 9, 2012.
Memorandum Opinion and Order of Judge James B. Moran in Case No. 04 C 5312, Feb. 9, 2005, 22 pages.
Memorandum Opinion and Order Re: '132 and '304 Claim Construction [425], Oct. 31, 2006.
Memorandum Opinion and Order Re: Court Reaffirming Priority dated Jan. 3, 2008.
Memorandum Opinion and Order Re: Defendant's Motion for Judgment as a Matter of Law on Indefiniteness [1141], Jan. 2, 2008.
Memorandum Opinion and Order Re: Defendant's Motion for Judgment as a Matter of Law on Willfulness [1144], Jan. 3, 2008.
Memorandum Opinion and Order Re: eSpeed's Motion for Summary Judgment of Invalidity Denied [845], Aug. 21, 2007.
Memorandum Opinion and Order Re: GL's Motion for Reconsideration Denied [994], Sep. 19, 2007.
Memorandum Opinion and Order Re: Inequitable Conduct dated May 6, 2008.
Memorandum Opinion and Order Re: Motions for Reconsideration [875], Aug. 27, 2007.
Memorandum Opinion and Order Re: No prior use dated Aug. 16, 2007.
Memorandum Opinion and Order Re: Non-Infringement [708], Jun. 20, 2007.
Memorandum Opinion and Order Re: Preliminary Injunction [83], Feb. 9, 2005.
Memorandum Opinion and Order Re: Prior Public Use [835], Aug. 16, 2007.
Memorandum Opinion and Order Re: Priority Date [1013], Sep. 25, 2007.
Memorandum Opinion and Order Re: Priority Date [769], Jul. 12, 2007.
Memorandum Opinion and Order Re: 'Single Action' Ruling [963], Sep. 12, 2007.
Memorandum Opinion and Order Re: TT's Motion for Clarification [475], Feb. 21, 2007.
Memorandum Opinion and Order Re: TT's Motion to Preclude Prior Sale Defense Denied [873], Aug. 27, 2007.
Midas Kapiti Delivery Note and Release Note—Market Trader V5.2b, Mar. 31, 1999, DX 619, G 096511-G 096527, DTX 619.
Midas Kapiti Delivery Note and Release Note—Market Trader V5.2e, Dx 623, G 105641-G 105667, DTX 623, May 24, 1999.
Midas Kapiti Release Notes—Market Trader V5.2, DX 621, G 096712-G 096727, DTX 621, May 26, 1999.
Midas Kapiti Release Notes—Market Trader V5.2e, Apr. 12, 1999, DX 620, G 096694-G 096711, DTX 620.
Midas Kapiti Release Notes—Market Trader V5.2e, DX 622, G 096728-G 096754, DTX 622, Jun. 1, 1999.
Midas-Kapiti International, Market Trader, Nikkei 225 & Nikkei 300 Index Options and Index Future Trading Users Guide, v1.3, alleged available as of Dec. 18, 1997, G0100463-0100481.
Midas-Kapiti International, Market Trader, Nikkei 225 & Nikkei 300 Index Options and Index Futures Trading Users Guide, Mar. 20, 1998, DX 618, G100444-G1 00462, DTX 618.
Midas-Kapiti International, Release Notes, Market Trader v.5.2e, alleged available as of May 24, 1999, G0105642-G0105667.
MINEX Service Outline User Test/Orientation, Sep. 1992, eS0064647-eS0064670.
MLT Trade Vizion, http://www.trade-viziion.com/modules.php?name+Products (Jul. 29, 2004).
Munshi, Jamal Huq. "The Impact of Information Technology on Securities Markets: Evidence from the New York Stock Exchange," PhD dissertation, University of Arkansas. Ann Arbor: ProQuest/UMI, Order No. 9237410, alleged available as of Jan. 1, 1991, G0147878-G0148049.
NASDAQ Workstation II User Guide, Guide to Enhancements for NASDAQ WorkStation II Software Release (Apr. 1998) as viewed on the Internet Archives at http://web.archive.org/web/20031208041112/nasdaqtrader.com/trader/tradingservices/productservices/userguides/nwliguide.pdf.
New York Mercantile Exchange (NYMEX) Access Documents, Feb. 28, 1992, 413 pages.
New York Stock Exchange, Display Book User Reference, alleged available as of Jan. 1, 1992, G0146068-G0146243.
New York Stock Exchange, Floor Operations Display Book Guide, Version 3.1, alleged available as of May 1998, G0145920-G0146065, DDX_Wille 011.
New York Stock Exchange, Portions of 1984 and 1985 Annual Reports, alleged available as of 1984, G0146656-G0146659.
New York Stock Exchange, Release 2.1 Display Book, alleged available as of Nov. 1, 1996, G0146649-0146650. DDX_Wille 010.
Nicholas Economides, 'Electronic Call Market Trading', Journal of Portfolio Management, 2/00/1995, eS0069585-eS0069610.
Notes re final additions/revisions, DX 435, CM 007949-CM 007955, DTX 435, Apr. 2, 1999.

(56) References Cited

OTHER PUBLICATIONS

Notice of Opposition to a European Patent by Deutsche Borse AG dated Jan. 12, 2006.
Notice of Opposition to a European Patent by EccoWare Ltd., dated Jan. 13, 2006.
Notice of Opposition to a European Patent by Rosenthal Collins Group LLC, dated Jan. 12, 2006.
Notice of Opposition to a European Patent by Tick-It GmBh, dated Jan. 13, 2006.
Notice of Opposition to a European Patent EP 1319211 B 1, AN INTRA Medienprojekte GmbH, dated Jan. 13, 2006.
Notification of Docket Entry Re: Defendant eSpeed's Motion for a New Trial is denied [1142], Jan. 3, 2008.
Notification of Docket Entry Re: Defendants eSpeed's Motion for Judgment as a Matter of Law on Invalidity is denied [1140], Jan. 3, 2008.
Notification of Information Offer Form, Jun. 3, 2005.
Office Action issued by USPTO dated Jun. 26, 2007 for U.S. Appl. No. 11/417,871.
Office Action issued by USPTO dated Mar. 23, 2007 for U.S. Appl. No. 10/125,894.
O'Hara and Oldfield, 'The Microeconomics of Market Making', Journal of Financial and Quantitative Analysis, 12/00/86, DTX 1169 Silverman000478-Silverman000493.
OM CLICK Trade User's Guide for Windows NT, 10/00/1998, eSOO064671-eSOO064773.
OM Click Trade User's Guide for Windows NT, including Addendum for HKFE, alleged available as of Oct. 1998, G0046709-0046816, DDX_Stengard 003.
OM, The OM Click Trade User Guide for Windows NT, alleged available as of Nov. 1997, G0202935-0203019, DDX_Stengard 002.
'One Click Trading Options,' Trading Technologies, Inc., 1998, one page.
Open E Cry, LLC's Initial Invalidity Contentions, Case No. 1:10-cv-00885, dated Oct. 19, 2010.
Opposition Trading Technologies, Inc. Application No. 01920183.9 EP 1319211 B1, Exhibit 4 (Japanese and English Versions), 9/00/1997.
Opposition TT, EP 1 319211 B1, Copy set 1, Annex One—Grounds of Opposition [8020], Jan. 19, 2006.
ORC Instructions for Use Version 2.2.8., 0/0/1999, eS0064775-eS0064787.
Orientation Materials for Participants New Future Options Trading System, Sep. 1997 (Tokyo Stock Exchange) produced at TSE609.
Osaka Securities Exchange (Japanese-language document), alleged available as of Jan. 1, 1997, G0046918-0046937.
Osaka Stock Exchange Manual (Japanese Document), Apr. 1996, REFCO0009773-REFCO0009826.
Overview re Digital trading facility, DX 443, CM 006315-CM 006344, DTX 443, alleged available as of Jan. 1, 1999.
Overview re SPATS; the Electronic Broker, DX 446, DTX 446, alleged available as of Jun. 26, 1986.
P.O.S. Display Book, Release 2.0: Screen Components Navigation & Layout, User Requirements Specification, alleged available as of Mar. 28, 1995, G0153405-0153428, DDX_Greenstein 008.
Patsystems News Rel. Nov. 6, 2000.
Peake, et al., Appendix C of Preliminary Feasibility Study, 'The ABCs of Trading on a National Market System,' Bermudex Ltd., Sep. 1997,16 pages.
Peake, J.W., Appendix E of Preliminary Feasibility Study, 'The Last Fifteen Meters,' Bermudex Ltd., Jun. 15, 1997,18 pages.
Philpot, J., and Peterson, C. "Improving the Investments or Capital Markets Course with Stock Market Specialist," Financial Practice and Education, Fall/Winter 1998, alleged available as of 1998, G0075378-0075384.
Photo of trader w/ APT screen, DX 151 , LIFFE 00167—LIFFE 00168, DTX 151, alleged available as of Mar. 1, 1994.

Photocopy of Disks containing exhibits A (disk alleged available as of Nov. 3, 1998) and B (disk alleged available as of Mar. 16, 1999) to declaration of W. Buist, PTX366, Jun. 23, 2006.
Piantoni, R., and Stancescu, C. "Implementing the Swiss Exchange Trading System," Proceedings of the 27th International Symposium on Fault-Tolerant Computing (FTCS), alleged available as of 1997, G0077767-G0077771.
Position paper: On-line training and customer acquisition; WIT Capital DSM product launch and related schedule to E. Lang, DX 436, DTX 436, CM 006580-CM 006590, Feb. 22, 1999.
Presentation re WIT Capital Digital stock market Phase 1 usability and customer response testing: Preliminary report of findings, DX 429, CM 007446-CM 007466, May 1, 2006.
Presentation re WIT DSM user interface Trade4.ppt, Oct. 12, 1998, DX 430, CM 008265-CM 008330, DTX 430.
PrimeTrade's application window, alleged available as of Jun. 22, 1998, DDX_Buhannic 004a.
PrimeTrade's application window, alleged available as of Jun. 22, 1998, G0080109-0080110, DDX_Buhannic 003.
U.S. Appl. No. 60/186,322, Certified Copy dated May 18, 2011, Opposition EP 1 319211 B1 Exhibit 13B.
U.S. Appl. No. 60/678,106, filed May 4, 2005, by Rosenthal et al., RCG-TT0146847.
U.S. Appl. No. 60/736,353, filed Nov. 13, 2005, by Mackey et al., RCG-TT0146879.
PTS Client Version 2.1 F, DX 119, PATS 00067-PATS 00082, DTX 119, alleged available as of Mar. 1, 1998.
PTS trading application Version 1.1 Beta H.1, Mar. 31, 1998, DX 118, PATS 00560-PATS 00560, DTX 118.
QuickTrade Document and Brochure, G021027-21031, alleged available as of Aug. 23, 2001.
RCG Expert Declaration of W. Buist in Case 1:05-cv-04088, *Rosenthal Collins Group, LLC*, vs. *Trading Technologies International, Inc.*, Apr. 26, 2006, PDX 365.
RCG Expert Declaration of Walter D. Buist in Case 1:05-cv-04088, *Rosenthal Collins Group, LLC*, vs. *Trading Technologies International, Inc.*, Sep. 29, 2006, PDX 952.
RCG's Presentation re Wit Capital, Apr. 22, 2004, DX 208, RCG 000635-RCG 000663, DTX 208.
REFCO English Translation of Tokyo Stock Exchange, Publication 1, 'Next-Generation Futures Options Trading System' (participants seminar materials), Sep. 1997.
REFCO English Translation of Tokyo Stock Exchange, Publication 2, 'Futures/Options Trading System Guidelines for Operating the Trading Terminals' (participants seminar materials), Aug. 1998.
REFCO English Translation Tokyo Stock Exchange, Publication 3, 'Tokyo Stock Exchange 50th Anniversary Book of Materials', Jul. 31, 2000.
Release Form for Sachs Communications Group, alleged available as of Sep. 15, 1998, DDX 204.
Release Form for Sachs Communications Group, alleged available as of Sep. 16, 1998, DDX 206.
Release Notes—Market Trader V5.2a, Mar. 18, 1999, DX 617, G 118137-G 118152, DTX617.
Rosenthal Collins Group LLC, Initial Contentions for Non-Infringement and Patent Invalidity, Civil Action No. 10-cv-929, dated Oct. 29, 2010.
Sachs Communication Group Release Form, alleged available as of Sep. 14, 1998, SACHS000055, DDX 202.
Sachs Communications Group Invoice to Mauro Designs, alleged available as of Oct. 20, 1998, SACHS000050-000051, DDX 197.
Sachs Communications Groups Client Sign-In Checklist, alleged available as of Sep. 14, 1998, SACHS000054, DDX 201.
Sachs Communications Groups Client Sign-In Form, alleged available as of Sep. 14, 1998, SACHS000053, DDX 200.
Sachs Communications Groups Client Sign-In Form, alleged available as of Sep. 15, 1998, SACHS000015, DDX 203.
Sachs Communications Groups Client Sign-In Form, alleged available as of Sep. 16, 1998, SACHS000027, DDX 205.
Sample screens of APT system, DX 150, DTX 150, alleged available as of Jan. 1, 1993.
Schroeder, M. "After-Hours Trading is Coming" Investor Relations Business, Mar. 15, 1999, DDX 550.

(56) References Cited

OTHER PUBLICATIONS

Schroeder, M. "Eclipse's After-Hours Trading Service Due to Debut This Summer" Web Finance, Mar. 15, 1999, DDX 550.
Schroeder, M. "Knight to Offer After-Hours Trading" Web Finance, Mar. 29, 1999, DDX 550.
Schwartz, R., and Weber, B. "Next-Generation Securities Market Systems: An Experimental Investigation of Quote-Driven and Order-Driven Trading" Journal of Management Information Systems, vol. 14, No. 2, p. 57-59, alleged available as of Fall 1997. CME-E0000786-0000808.
Screen No. 100-Order Book & Order Entry 1 (Single View), eS060637-eS060639, alleged available as of Apr. 1996.
Screenshot of C:\ drive, alleged available as of Apr. 18, 2006, PDX 951.
Screenshot of filepath L:\java\com\witcapital\dsm\client, alleged available as of Nov. 3, 1998, PDX 953.
Screenshot of GL TradePad, G0119660, alleged available as of Jan. 26, 1999.
ScreenShots: Patsystem "Canned" Demo, 02/00/97, DX 120, PATS 00545-PATS 00559, DTX 120.
Securities Industries News, 'TT Upgrades Software Platform', Aug. 28, 2000 (D6).
Singapore Application No. 2004-06082-8, Corrected Search Report and Written Opinion issued by Australian Patent Office (dated Feb. 7, 2006) (8 pages).
Singapore Application No. 2004-06082-8, Search Report and Written Opinion issued by Australian Patent Office (dated Sep. 23, 2005) (10 pages).
SISS Functional specifications version 2.1, Feb. 16, 1988, DX 445, DTX 445.
SPATS (Security Pacific Automated Trader System), The Electronic Broker, User Manual, alleged available as of Jun. 26, 1986, WF005924-WF005964.
Specialist vs. Saitori: Market-Making in New York and Tokyo, Richard Lindsay and Ulrike Schaede, DTX 1170, 7-8/00/1992, SilvermanOO0494-SilvermanOO0506.
Square, Final Fantasy ll Instruction Booklet, alleged available as of Jan. 1, 1991, RCG-TT0146485-0146525.
Status review specialist support system study NYSE, Apr. 10, 1986, DX 447, DTX 447.
Supplemental Invalidity and Unenforceability Contentions of GL, Civil Action No. 05-cv-4120, dated Mar. 8, 2013.
Supplemental Invalidity Contentions Pursuant to 35 U.S.C. 282, Aug. 10, 2007.
Swiss Exchange SWX—TS User Manual, Dec. 31, 1998, DTX 2215, eS0032293-e50032547.
Swiss Exchange SWX, TS User Manual, Version 2.1, alleged available as of Dec. 31, 1998, G0107838-G0108086.
SWX, Annual Report, 1998, G0048218-0048270.
SWX, Bourse suisse Manuel d'utilisateur TS, v2.0 (French-language document), alleged available as of Aug. 31, 1996, G0079810-0080070, DDX_Buhannic 006.
SWX, Swiss Exchange SWX Presentation, IT Overview, alleged available as of Nov. 2, 1999, G0087803-0087818, DDX_Buhannic 0014.
SWX, The Swiss Exchange: From vision to reality, alleged available as of Dec. 1996, G0048801-0048838.
SWX, The SWX Platform and Associated Systems, alleged available as of May 1, 2006, G0029564-0029633, DDX_Buhannic 009.
'Sydney Futures Exchange Announces Plans to Join GLOBEX,' GLOBEX Report: An Update on the CME global electronic exchange, vol. II, No. 2, Feb. 10, 1989,4 pages.
System for Buying and Selling Futures and Options Transaction Terminal Operational Guidelines, TSE Business Systems Dept., TSE00647-810, eS062297-eS062366, D1 (2), alleged available as of Aug. 1, 1998.
System for Buying and Selling Futures and Options Transaction Terminal Operational Guidelines, TSE Business Systems Dept., T5E647-995, eS062297-e5062380, alleged available as of Aug. 1, 1998.

Terminal Use Manual—Windows NT Version, Tokyo International Financial Futures Exchange (TIFFE),1994, Silverman002552-Silverman002616, DTX 1226.
The Application Program Interface (API) Reference Manual for LIFFE Connect, Release 2.7, Sep. 1998, DDX 163, DTX 163, eSOO059868-eSOO059958.
The Application Program Interface (API) Reference Manual for LIFFE Connect, Release 3.0, Sep. 1998, DDX 159, DTX 159, eSOO060055-eSOO060145.
The Application Program Interface (API) Reference Manual for LIFFE Connect, Release 3.1, Sep. 1998, EP 1 319211 B1 Exhibit 7A, e80060146-e80060237.
The Application Program Interface (API) Reference Manual for LIFFE Connect, Release 3.2, Dec. 1998, DDX 161, DTX 161, eSOO060239-eSOO060331.
The Application Program Interface (API) Reference Manual for LIFFE Connect, Release 3.3, Jan. 1999, DDX 162, DTX 162, eSOO059959-eSOO060054.
The Complete GLOBEX2 Handbook, Jul. 1998, DX637, DTX637, CME-E014048-CME-E014286.
The Complete GLOBEX2 Handbook, May 1998, DX635, DTX635, CME-E0010679-0010891.
The Computer Assisted Trading System (CATS) Traders' Manual, Toronto Stock Exchange, Sep. 30, 1977, 142 pages.
Thomson Financial leaflet, G0022445-22450, Sep. 2003.
TIFFE Internet Article, 'New On-Screen Trading Terminals', E2, Retrieved from the Internet on Oct. 1, 2006.
TIFFE Manual (Japanese Document), Jan. 1996, REFCO0010861-REFCO0011210.
Tokyo Stock Exchange, Document 1, 'Downloading the Terminal Program and Sending the Replacement for the Guidelines for Operating the Trading Terminals', Jan. 2000.
Tokyo Stock Exchange, Publication 1, 'Next-Generation Futures Options Trading System' (participants seminar materials), Sep. 1997.
Tokyo Stock Exchange, Publication 2, 'Futures/Options Trading System Guidelines for Operating the Trading Terminals', Aug. 1998.
Tokyo Stock Exchange, Publication 3, 'Tokyo Stock Exchange 50th Anniversary Book of Materials', Jul. 31, 2000.
TradePad Instructions (French), G0025748-G0025749, alleged available as of Jan. 11, 1999.
Tradepad.txt (French), Mar. 8, 2000, G0025616-G0025618.
TradePad.vsd Document, Feb. 9, 1999, G011169-G0111670.
TradeStation's Initial Invalidity Contentions, Civil Action No. 10-cv-884, dated Oct. 12, 2010.
Trading Pad Document (E3), Jul. 27, 2005.
Trading Pad User Manual, Aug. 10, 1999, DX 539, G 112123-G 112131, DTX 539.
Trading pad.doc Document, Jan. 26, 1999, G0111671-G0111672.
Trading Screen, INTEX of Bermuda, 1984, one page.
Trading Screen, MEFF Exchange, 1990, one page.
Trading Screen, SWX Exchange, 1990, two pages.
Trading Screen, TIFFE Exchange, circa 1989-1990, one page.
*Trading Technologies International, Inc., v. Ninja Trader, LLC,* Complaint for Patent Infringement and Jury Demand, Jul. 7, 2005, DDX 360.
Trading Technologies Trader System User Documentation, Apr. 1, 1998, Release 3.10, DX 3, TT 015867-TT 015955, DTX 3.
Trading Technologies, "X_TRADER 6.0", Jun. 22, 2001. [Retrieved from the Internet on Feb. 3, 2010: http://web.archive.org/web20010622135748/http://www.tradingtechnologies.com/products/xtrader.htm].
TradingPad.doc, Apr. 30, 1999, G0112117-G0112122.
TradingScreen, FuturesHUB Brochure, alleged available as of Nov. 1, 2007, DDX_Buhannic 013.
Trial testimony of Atsushi Kawashima [4032] dated Sep. 26, 2007 with DTX 183.
Trial testimony of Barbara Wattiez dated Sep. 28, 2007 with DTX 592-593A; DTX 597-598; DTX 718-719; DTX 722.
Trial testimony of Bruno Spada dated Sep. 24, 2007 with DTX 306; DTX 384; DTX 518-522; DTX 524; DTX 575; DTX 579-580; DTX 593; DTX 626; DTX 628; DTX 646; DTX 1899 DTX 2086; DTX

(56) References Cited

OTHER PUBLICATIONS 3020-3021; DTX 3058-3059; DTX 3061; DTX 3085; PTX 737; PTX 840; PTX 2083; PTX 2087; PTX 2099; PTX 2101.

Trial testimony of Fred Mastro [6189] dated Sep. 25,2007 with DTX 592.

Trial testimony of Gerard Varjacques dated Sep. 28, 2007 with PTX 509-510 and PTX 513.

Trial testimony of Hiroyuki Kida dated Sep. 28, 2007 and Oct. 1, 2007 with DTX 617.

Trial testimony of Jean Cedric Jollant [6133] dated Sep. 20, 2007 with DTX 157; DTX 473; DTX 719; DTX551-64; DTX598; DTX722; DTX 1903; DTX3009-10; DTX3014; DTX3016-18; DTX 3020; DTX 3023; DTX 3025; PTX 166; PTX 520; PTX 526; PTX 539; PTX 573; PTX 575; PTX 579; PTX 2065.

Trial Testimony of Laurent Havard dated Sep. 21,2007 with DTX 384; DTX 520; DTX 561-62; DTX 570; DTX 573; DTX 575; DTX 593; DTX 750-52; DTX 3011; DTX 3017-18; DTX 3050; PTX 575; PTX 2064; PTX 2074; PTX 2077; PTX 2079.

Trial testimony of Michael Glista [5055] dated Sep. 24, 2007 and Sep. 25, 2007 with DTX 382-386; DTX 524; DTX 570; DTX 579; DTX 592; DTX 3020; DTX 3050; DTX 3057; DTX 3110; PTX 1993; PTX 2065; PTX 2092; PTX 2094.

Trial testimony of Neil Treloar dated Sep. 21, 2007 and Sep. 24, 2007 with DTX 2040-2042.

Trial testimony of Nicholas Garrow [5081] (via expert witness) dated Oct. 2, 2007.

TSE Japanese Document, pp. 4-15, alleged available as of Aug. 1, 1997.

TSE Japanese Document, pp. 6-15, alleged available as of Aug. 1, 1998.

TSE Manual (Japanese Document), Nov. 15, 2005, DX179, TSE647-995, w/certified translation eS62258-62366 [TSE609-647,694-711 ,714-721 ,735-736,749-756,759-760,779-782,784-810,982-995].

TSE Manual (Japanese-language document), System for Buying and Selling Futures and Options Transaction Terminal Operational Guidelines, alleged available as of Aug. 1, 1998, TSE0000000647-TSE0000000995.

TT X-Trader Brochure, Dec. 1, 2006 (E7).

Updated negotiations design to E. Lang from C. Mauro for review and approval prior to patent application, DX 434, CM 008410-CM 008414, DTX 434,Jan. 18, 1999.

User Guide V4.60 LIFFE Connect for Futures by GL Trade, 06/00/99, DX 605, G 123548-G 123603, DTX 605.

User Interface Design for display options design, DX 426, CM 000249-CM 000287, DTX 426, Jul. 8, 1998.

User interface design specification for WIT capital digital stock market, DX 433, DTX 433 CM 008441-CM 008478, Jan. 18, 1999.

USPTO Presentation, NASDAQ, Nov. 8, 2001, 15 pages.

USPTO Press Release, 'Electronic Patent Application Records Replace Paper Files at USPTO', DTX 2285,Sep. 19, 2007.

Utility Patent Application Transmittal Re: Computer Trading System, Method and Interface, Apr. 15, 1999, Mauro, Kleia, and Buist, DTX368.

Various declarations Re: U.S. Appl. No. 09/292,552, filed Nov. 3, 2003, DX 284, TT 099877-TT 099907, DTX 284.

Wang, J., Asymmetric Information and the Bid-Ask Spread: an Empirical Comparison between Automated Order Execution and Open Outcry Auction, Journal of International Financial Markets, Institutions and Money, Apr. 1999, vol. 9, Iss. 2, pp. 115-128.

Weber, B., "Assessing Alternative Market Structures Using Simulation Modeling," in Global Equity Markets: Technological, Competitive, and Regulatory Challenges, ed. Robert A. Schwartz (New York: New York University, 1995) p. 157-184, alleged available as of 1995, DONEFER003919-003935.

Weber, B., "Elements of Market Structure for On-Line Commerce" in Future Markets: How Information Technology Shapes Competition, C. Kemerer (ed.), Kluwer Academic Publishers, p. 15-32, alleged available as of 1998, CME-E0000809-CME-E0000826.

Weber, B.W., 'Information Technology in the Major International Financial Markets,' Stem School of Business, New York University, Apr. 7, 1993, pp. 1-43.

Weber, Bruce William. "Information Technology and Securities Markets: Feasibility and Desirability of Alternative Electronic Trading Systems," PhD dissertation, University of Pennsylvania. Ann Arbor: ProQuest/UMI, Order No. 9125774, alleged available as of 1991, G0171612-0171925.

Website of EccoWare, Professional Software for Professional Traders, [Retrieved from the Internet at http://www.eccoware.com/products.php on Jan. 23, 2007], alleged available as of Jan. 23, 2007, PDX_Feltes 002.

WIT Capital after hours trading system, Mauro, Mar. 19, 1999, DX 440, CM 009028-CM 009059, DTX 440.

WIT Capital check, alleged available as of Oct. 19, 1998, DDX 199.

WIT Capital Corporation digital trading facility presentation, 03/00/99, DX 441 , DTX 441.

WIT Capital digital trading facility presentation to Goldman Sachs, DX 438, CM 004523-CM 004547, DTX 438, alleged available as of Jan. 1, 1999.

WIT Capital Digital trading facility presentation to PaineWebber, Inc., DX 439, DTX 439, alleged available as of Nov. 11, 1998.

WIT Capital invoice, alleged available as of Sep. 30, 1998, DDX 198.

WIT Capital limit order book to L. Forrest from C. Mauro, DX 425, CM 007382-CM 007411, DTX 425,Apr. 20, 1998.

WIT Capital pdf operator manual for Digital trading facility, 00/00/1999, DX 442, CM 00651 O-CM 006513, DTX 442.

WIT Digital Stock Market, User Interface Rev. 9, Exhibit 15, copied on Oct. 16, 2006.

WIT DSM Presentation re Information display and decision variables, Dec. 20, 1998, DX 431, CM 004334-CM 004347, DTX 431.

WIT DSM user interface instructions, Aug. 6, 1998, DX 427, CM 006591-CM 006632, DTX 427.

Wright, W., "Research Report—Information Animation Applications in the Capital Markets," Visible Decisions, Inc., IEEE, 1995, pp. 19-25 & 136-137.

X_Trader Product HTML Page [online], Trading Technologies International, Inc., Jun. 9, 2000. [Retrieved on Mar. 22, 2001] from the Internet: www.tradingtechnologies.com/products/xtrade_full.html.

Yahoo! Finance [online], Yahoo!, 1995, p. 1.

Extended European Search Report in European Patent Application No. 10183939.7 dated Jan. 22, 2015, dated Jan. 30, 2015.

Arms, Richard W., Jr., Profits in Volume: Equivolume Charting, Investors Intelligence, Inc., Larchmont, NY, 1971.

Cooper, Alan, About Face: The Essentials of User Interface Design, IDG Books Worldwide, Inc., Foster City, CA, 1995, pp. 1-134.

Cooper, Alan, About Face: The Essentials of User Interface Design, IDG Books Worldwide, Inc., Foster City, CA, 1995, pp. 135-311.

Cooper, Alan, About Face: The Essentials of User Interface Design, IDG Books Worldwide, Inc., Foster City, CA, 1995, pp. 312-457.

Cooper, Alan, About Face: The Essentials of User Interface Design, IDG Books Worldwide, Inc., Foster City, CA, 1995, pp. 458-580.

Decision Denying Institution of Covered Business Method Patent Review in *TD Ameritrade* v. *Trading Technologies International, Inc.*, CBM 2014-00136, entered Dec. 2, 2014.

Decision on Institution of Covered Business Method Patent Review in *TD Ameritrade* v. *Trading Technologies International, Inc.*, CBM 2014-00131, entered Dec. 2, 2014.

Decision on Institution of Covered Business Method Patent Review in *TD Ameritrade* v. *Trading Technologies International, Inc.*, CBM 2014-00133, entered Dec. 2, 2014.

Decision on Institution of Covered Business Method Patent Review in *TD Ameritrade* v. *Trading Technologies International, Inc.*, CBM 2014-00135, entered Dec. 2, 2014.

Decision on Institution of Covered Business Method Patent Review in *TD Ameritrade* v. *Trading Technologies International, Inc.*, CBM 2014-00137, entered Dec. 2, 2014.

Declaration of David Rho in support of Petition for Covered Business Method Review in *TD Ameritrade* v. *Trading Technologies International, Inc.*, CBM 2014-00133, dated May 19, 2014.

(56) References Cited

OTHER PUBLICATIONS

Declaration of David Rho in support of Petition for Covered Business Method Review in *TD Ameritrade v. Trading Technologies International, Inc.*, CBM 2014-00135, dated May 19, 2014.
Declaration of David Rho in support of Petition for Covered Business Method Review in *TD Ameritrade v. Trading Technologies International, Inc.*, CBM 2014-00136, dated May 19, 2014.
Declaration of David Rho in support of Petition for Covered Business Method Review in *TD Ameritrade v. Trading Technologies International, Inc.*, CBM 2014-00137, dated May 19, 2014.
Declaration of Kendyl A. Roman in support of Petition for Covered Business Method Review in *TD Ameritrade v. Trading Technologies International, Inc.*, CBM 2014-00131, dated May 17, 2014.
Declaration of Kendyl A. Roman in support of Petition for Covered Business Method Review in *TD Ameritrade v. Trading Technologies International, Inc.*, CBM 2014-00133, dated May 19, 2014.
Declaration of Kendyl A. Roman in support of Petition for Covered Business Method Review in *TD Ameritrade v. Trading Technologies International, Inc.*, CBM 2014-00135, dated May 19, 2014.
Declaration of Kendyl A. Roman in support of Petition for Covered Business Method Review in *TD Ameritrade v. Trading Technologies International, Inc.*, CBM 2014-00136, dated May 19, 2014.
Declaration of Kendyl A. Roman in support of Petition for Covered Business Method Review in *TD Ameritrade v. Trading Technologies International, Inc.*, CBM 2014-00137, dated May 19, 2014.
Deel, Robert, The Strategic Electronic Day Trader, John Wiley & Sons, Inc., New York, NY, 2000.
Definition of the term "default", Microsoft Computer Dictionary, Fifth Edition, Microsoft Corporation, Redmond, WA, 2002, p. 150.
Definition of the term "default", Webster's New World College Dictionary, Fourth Edition, 2000, p. 378.
Freedman, Alan. Definition of the term "default", The Computer Glossary, Fifth Edition, The Computer Language Company Inc., New York, NY, 1991, p. 175.
Harris, Sunny J., Trading 101: How to trade like a pro, John Wiley & Sons, Inc., New York, NY, 1996.
Hordeski, Michael F. Definition of the term "default", The Illustrated Dictionary of Microcomputers, Third Edition, TAB Books, Blue Ridge Summit, PA, 1990, p. 90.
Memorandum Opinion and Order issued by Judge Sharon Johnson Coleman in Trading *Technologies International, Inc. v. CQG, Inc., and CQGT, LLC*, Case 05-cv-4811, dated Feb. 27, 2015.
Microsoft Computer Dictionary, Fifth Edition, Microsoft Corporation, Redmond, WA, 2002, pp. 102, 150, 174, 176, 348.
Patent Owner's Preliminary Response in *CQG v. Trading Technologies International, Inc.*, CBM 2015-00057, filed May 6, 2015.
Patent Owner's Preliminary Response in *CQG v. Trading Technologies International, Inc.*, CBM 2015-00058, filed May 6, 2015.
Patent Owner's Preliminary Response in *TD Ameritrade v. Trading Technologies International, Inc.*, CBM 2014-00131, filed Sep. 3, 2014.
Patent Owner's Preliminary Response in *TD Ameritrade v. Trading Technologies International, Inc.*, CBM 2014-00133, filed Sep. 3, 2014.
Patent Owner's Preliminary Response in *TD Ameritrade v. Trading Technologies International, Inc.*, CBM 2014-00135, filed Sep. 3, 2014.
Patent Owner's Preliminary Response in *TD Ameritrade v. Trading Technologies International, Inc.*, CBM 2014-00136, filed Sep. 3, 2014.
Patent Owner's Preliminary Response in *TD Ameritrade v. Trading Technologies International, Inc.*, CBM 2014-00137, filed Sep. 3, 2014.
Patent Owner's Response in *TD Ameritrade v. Trading Technologies International, Inc.*, CBM 2014-00131, filed Mar. 6, 2015.
Patent Owner's Response in *TD Ameritrade v. Trading Technologies International, Inc.*, CBM 2014-00133, filed Mar. 6, 2015.
Patent Owner's Response in *TD Ameritrade v. Trading Technologies International, Inc.*, CBM 2014-00135, filed Mar. 6, 2015.
Patent Owner's Response in *TD Ameritrade v. Trading Technologies International, Inc.*, CBM 2014-00137, filed Mar. 6, 2015.
Petition for Covered Business Method Review in *CQG v. Trading Technologies International, Inc.*, CBM 2015-00057, dated Jan. 9, 2015.
Petition for Covered Business Method Review in *CQG v. Trading Technologies International, Inc.*, CBM 2015-00058, dated Jan. 9, 2015.
Petition for Covered Business Method Review in *TD Ameritrade v. Trading Technologies International, Inc.*, CBM 2014-00131, dated May 19, 2014.
Petition for Covered Business Method Review in *TD Ameritrade v. Trading Technologies International, Inc.*, CBM 2014-00133, dated May 19, 2014.
Petition for Covered Business Method Review in *TD Ameritrade v. Trading Technologies International, Inc.*, CBM 2014-00135, dated May 19, 2014.
Petition for Covered Business Method Review in *TD Ameritrade v. Trading Technologies International, Inc.*, CBM 2014-00136, dated May 20, 2014.
Petition for Covered Business Method Review in *TD Ameritrade v. Trading Technologies International, Inc.*, CBM 2014-00137, dated May 19, 2014.
Quercia, Valerie and O'Reilly, Tim, X Window System User's Guide: OSF/Motif 1.2 Edition, vol. 3., O'Reilly & Associates, Inc., Sebastopol, CA, 1993, pp. 1-253.
Quercia, Valerie and O'Reilly, Tim, X Window System User's Guide: OSF/Motif 1.2 Edition, vol. 3., O'Reilly & Associates, Inc., Sebastopol, CA, 1993, pp. 254-575.
Quercia, Valerie and O'Reilly, Tim, X Window System User's Guide: OSF/Motif 1.2 Edition, vol. 3., O'Reilly & Associates, Inc., Sebastopol, CA, 1993, pp. 576-923.
Reuters Globex User Guide, Jun. 1995.
Shneiderman, Ben, Designing the User Interface: Strategies for Effective Human-Computer Interaction, Third Edition, The University of Maryland, Addison Wesley Longman Inc., 1998, pp. 1-233.
Shneiderman, Ben, Designing the User Interface: Strategies for Effective Human-Computer Interaction, Third Edition, The University of Maryland, Addison Wesley Longman Inc., 1998, pp. 234-492.
Shneiderman, Ben, Designing the User Interface: Strategies for Effective Human-Computer Interaction, Third Edition, The University of Maryland, Addison Wesley Longman Inc., 1998, pp. 493-638.
Smith, Vernon L. "An Experimental Study of Competitive Market Behavior" The Journal of Political Economy, vol. LXX, No. 2, Apr. 1962, pp. 111-137.
Sun Microsystems, Inc., Open Look Graphical User Interface Functional Specification, Addison-Wesley Publishing Company, Inc., 1989.
TD Ameritrade Translation of 'Futures/Option Purchasing System Trading Terminal Operation Guide', Tokyo Stock Exchange, Aug. 1998.
Tufte, Edward R., Envisioning Information, Graphics Press, Cheshire, CT, 1990.
Tufte, Edward R., The Visual Display of Quantitative Information, Graphics Press, Cheshire, CT, 1983.
Weiss, David M., "After the Trade is Made: Processing Securities Transactions," $2^{nd}$ ed., NYIF Corp., 1993, pp. 44-46.
Powers, Mark J., "Starting Out in Futures Trading," Sixth Edition, McGraw-Hill, 2001, p. 324-325.
Petition for Covered Business Method Review in U.S. Pat. No. 7,533,056, CBM 2015-00179, dated Sep. 2, 2015.
Petition for Covered Business Method Review in U.S. Pat. No. 7,676,411, CBM 2015-00181, dated Sep. 11, 2015.
Petition for Covered Business Method Review in U.S. Pat. No. 6,772,132, CBM 2015-00182, dated Sep. 11, 2015.
Petition for Covered Business Method Review in U.S. Pat. No. 7,685,055, CBM 2016-0009, dated Oct. 23, 2015.
Petition for Covered Business Method Review in U.S. Pat. No. 7,813,996, CBM 2016-0031, dated Feb. 9, 2016.
Petition for Covered Business Method Review in U.S. Pat. No. 7,212,999, CBM 2016-0032, dated Feb. 9, 2016.

(56) References Cited

OTHER PUBLICATIONS

Petition for Covered Business Method Review in U.S. Pat. No. 7,904,374, CBM 2016-0051, dated Mar. 29, 2016.
Petition for Covered Business Method Review in U.S. Pat. No. 7,693,768, CBM 2016-0054, dated Apr. 12, 2016.
Petition for Covered Business Method Review in U.S. Pat. No. 7,412,416, CBM 2016-0087, dated Jun. 3, 2016.
Petition for Covered Business Method Review in U.S. Pat. No. 7,725,382, CBM 2016-0090, dated Jun. 13, 2016.
Declaration of Kendyl A. Roman in support of Petition for Covered Business Method Review of U.S. Pat. No. 7,533,056, CBM 2015-00179, dated Sep. 1, 2015.
Declaration of David Rho in support of Petition for Covered Business Method Review of U.S. Pat. No. 7,676,411, CBM 2015-00181, dated Sep. 11, 2015.
Declaration of Kendyl A. Roman in support of Petition for Covered Business Method Review of U.S. Pat. No. 7,676,411, CBM 2015-00181, dated Sep. 10, 2015.
Declaration of David Rho in support of Petition for Covered Business Method Review of U.S. Pat. No. 6,772,132, CBM 2015-00182, dated Sep. 11, 2015.
Declaration of Kendyl A. Roman in support of Petition for Covered Business Method Review of U.S. Pat. No. 6,772,132, CBM 2015-00182, dated Sep. 11, 2015.
Declaration of David Rho in support of Petition for Covered Business Method Review of U.S. Pat. No. 7,685,055, CBM 2016-0009, dated Oct. 1, 2015.
Declaration of Kendyl A. Roman in support of Petition for Covered Business Method Review of U.S. Pat. No. 7,685,055, CBM 2016-0009, dated Oct. 19, 2015.
Declaration of Kendyl A. Roman in support of Petition for Covered Business Method Review of U.S. Pat. No. 7,813,996, CBM 2016-0031, dated Feb. 4, 2016.
Declaration of Kendyl A. Roman in support of Petition for Covered Business Method Review of U.S. Pat. No. 7,212,999, CBM 2016-0032, dated Feb. 9, 2016.
Declaration of Kendyl A. Roman in support of Petition for Covered Business Method Review of U.S. Pat. No. 7,904,374, CBM 2016-0051, dated Mar. 29, 2016.
Declaration of Kendyl A. Roman in support of Petition for Covered Business Method Review in U.S. Pat. No. 7,693,768, CBM 2016-0054, dated Apr. 12, 2016.
Declaration of Kendyl A. Roman in support of Petition for Covered Business Method Review in U.S. Pat. No. 7,412,416, CBM 2016-0087, dated Jun. 2, 2016.
Declaration of Kendyl A. Roman in support of Petition for Covered Business Method Review in U.S. Pat. No. 7,725,382, CBM 2016-0090, dated Jun. 10, 2016.
Inside Microsoft Office 95, Cobb Group, ISSN 1093-426x 1086-8178, electronic journals (Feb. 1996-Feb. 1999). "Summarizing Data with Excel's Consolidate . . . Command"; https://msdn.microsoft.com/en-us/library/cc750889.aspx, Mar. 1997.
TT Exhibit 2nd CBM 1004: TSE (IBG Translation) Futures/Option Purchasing System Trading Terminal Operation Guide (IBG 1004 in CBM of U.S. Pat No. 7,533,056), TSE0000000647-981, 338 pages.
TT Ex. 2332 in CBM 2016-00009—Certified Translation of Chapter 6 of TSE, pp. 0068-0069.
TT Ex. 2333 in CBM 2016-00009—Certification of Translation of Chapter 6 of TSE, pp. 0068-0069.
Patent Owner's Response in U.S. Pat. No. 7,813,996, CBM 2016-00031, dated Nov. 8, 2016.
Declaration of Christopher H. Thomas in support of Patent Owner's Response in U.S. Pat. No. 7,813,996, CBM 2016-00031, dated Nov. 5, 2016.
Patent Owner's Response in U.S. Pat. No. 7,212,999, CBM 2016-00032, dated Nov. 15, 2016.
Declaration of Christopher H. Thomas in support of Patent Owner's Response in U.S. Pat. No. 7,212,999, CBM 2016-00032, dated Nov. 11, 2016.
Patent Owner's Response in U.S. Pat. No. 7,904,374, CBM 2016-00051, dated Nov. 15, 2016.
Declaration of Christopher H. Thomas in support of Patent Owner's Response in U.S. Pat. No. 7,904,374, CBM 2016-00051, dated Nov. 11, 2016.
Decision on Institution of Covered Business Method Patent Review of U.S. Pat. No. 7,693,768, CBM 2016-00054, entered Oct. 18, 2016.
Decision on Institution of Covered Business Method Patent Review of U.S. Pat. No. 7,818,247, CBM 2016-00086, entered Dec. 1, 2016.
Decision on Institution of Covered Business Method Patent Review of U.S. Pat. No. 7,412,416, CBM 2016-00087, entered Dec. 1, 2016.
Decision on Institution of Covered Business Method Patent Review of U.S. Pat. No. 7,725,382, CBM 2016-00090, entered Dec. 9, 2016.
Final Written Decision in Covered Business Method Patent Review of U.S. Pat. No. 6,766,304, CBM2015-00161, joined with CBM2016-00035, entered Feb. 17, 2017.
Final Written Decision in Covered Business Method Patent Review of U.S. Pat. No. 7,533,056, CBM2015-00179, entered Feb. 17, 2017.
Final Written Decision in Covered Business Method Patent Review of U.S. Pat. No. 6,772,132, CBM2015-00182, entered Feb. 28, 2017.
Final Written Decision in Covered Business Method Patent Review of U.S. Pat. No. 7,676,411 CBM2015-00181, entered Mar. 3, 2017.
Appeal Disposition—*Affirmance in Trading Technologies International, Inc.* v. *CQG, Inc., CQG, LLC, FKA CQGT, LLC*, case No. 2016-1616, decided Jan. 18, 2017.
U.S. Appl. No. 60/151,468, filed Aug. 30, 1999, Friesen, et al.
Declaration of Christopher H. Thomas in support of Patent Owner's Response in U.S. Pat. No. 7,685,055, CBM 2016-00009, dated Jul. 19, 2016.
Patent Owner's Preliminary Response in U.S. Pat. No. 7,685,055, CBM 2016-00009, dated Feb. 2, 2016.
Patent Owner's Response in U.S. Pat. No. 7,685,055, CBM 2016-00009, dated Jul. 21, 2016.
TT Ex. 2330 in CBM 2016-00009—Annotated excerpts of Figure from TSE Translation DX179, p. 0068.
TT Ex. 2331 in CBM 2016-00009—Deposition Transcript of David Rho, Jul. 14, 2016.
TT Ex. 2334 in CBM 2016-00009—Declaration of Harold Abilock, Jul. 14, 2016.
TT Ex. 2339 in CBM 2016-00009—Declaration of Harold Abilock, Jul. 19, 2016.
Re-exam Certificate for U.S. Pat. No. 6,766,304, issued Mar. 31, 2009.
Re-exam Certificate for U.S. Pat. No. 6,772,132, issued Mar. 31, 2009.
Final Written Decision in Covered Business Method Patent Review of U.S. Pat. No. 7,685,055, CBM2016-00009, entered Apr. 26, 2017.
Patent Owner's Response in Covered Business Method Patent Review of U.S. Pat. No. 7,818,247, CBM 2016-00086, dated Feb. 22, 2017.
Final Written Decision in Covered Business Method Patent Review of U.S. Pat. No. 7,693,768, CBM2016-00054, dated Oct. 17, 2017.
Final Written Decision in Covered Business Method Patent Review of U.S. Pat. No. 7,412,416, CBM2016-00087, dated Nov. 17, 2017.
Final Written Decision in Covered Business Method Patent Review of U.S. Pat. No. 7,818,247, CBM2016-00086, dated Nov. 17, 2017.
Final Written Decision in Covered Business Method Patent Review of U.S. Pat. No. 7,725,382, CBM2016-00090, dated Dec. 7, 2017.
Appellee's Response Brief in Appeal from CBM2015-00179, Case No. 17-2257, filed Apr. 5, 2018.
Appellees' Response Brief in Appeal from CBM2016-00032, Case No. 18-1063, filed May 18, 2018.
Brief of Appellant in Appeal from CBM2016-00032, Case No. 18-1063, filed Feb. 23, 2018.
Brief of Appellant in Appeal from CBM2016-00087, Case No. 18-1438, filed Jun. 4, 2018.
Corrected Brief of Appellant in Appeal from CBM2015-00179, Case No. 17-2257, filed Apr. 26, 2018.

(56) References Cited

OTHER PUBLICATIONS

Determination—Reexamination Ordered of U.S. Pat. No. 7,533,056 dated Sep. 23, 2015.
Determination—Reexamination Ordered of U.S. Pat. No. 7,685,055 dated Jan. 28, 2016.
Examiner's Answer in Reexamination of U.S. Pat. No. 7,533,056 dated Sep. 19, 2017.
Examiner's Answer in Reexamination of U.S. Pat. No. 7,685,055 dated Apr. 25, 2017.
Final Written Decision in Covered Business Method Patent Review of U.S. Pat. No. 7,212,999, CBM2016-00032, dated Aug. 14, 2017.
Patent Board Decision on Appeal—Examiner Reversed in Reexamination of U.S. Pat. No. 7,685,055 dated May 1, 2018.
Patent Owner's Appeal Brief in Reexamination of U.S. Pat. No. 7,533,056 dated Apr. 6, 2017.
Patent Owner's Appeal Brief in Reexamination of U.S. Pat. No. 7,685,055 dated Mar. 3, 2017.
Reply Brief of Appellant in Appeal from CBM2015-00179, Case No. 17-2257, filed Apr. 19, 2018.
Request for Ex Parte Reexamination of U.S. Pat. No. 7,533,056 dated Sep. 2, 2015.
Request for Ex Parte Reexamination of U.S. Pat. No. 7,685,055 dated Nov. 10, 2015.
Final Written Decision in Covered Business Method Patent Review of U.S. Pat. No. 7,813,996, CBM2016-00031, dated Aug. 7, 2017.
Final Written Decision in Covered Business Method Patent Review of U.S. Pat. No. 7,904,374, CBM2016-00051, dated Aug. 7, 2017.
"Vhayu Offers Additional Data Feed Handlers for North American Equities, Options and Futures," M2 Presswire, Normans Media Ltd., Jan. 7, 2008, retrieved Aug. 19, 2014 from ProQuest.
Alonzi, P., et al., "An Innovative Approach in Teaching Futures: A Participatory Futures Trading Simulation," Financial Practice & Education, 10820698, Spring/Summer 2000, vol. 10, Issue 1.
Extended European Search Report in European Patent Application No. 16202297.4 dated Feb. 2, 2017, dated Feb. 13, 2017.

* cited by examiner

CLICK BASED TRADING WITH MARKET DEPTH DISPLAY

CROSS REFERENCE TO RELATED APPLICATIONS

The present application is a continuation of U.S. patent application Ser. No. 11/415,189, filed May 2, 2006, now U.S. Pat. No. 8,694,398, which is a continuation of U.S. patent application Ser. No. 11/061,554, filed Feb. 18, 2005, now U.S. Pat. No. 7,505,932, which is a continuation of U.S. patent application Ser. No. 09/589,751, filed Jun. 9, 2000, now U.S. Pat. No. 6,938,011, which claims priority from U.S. Provisional Patent Application 60/186,322, entitled "Market Depth Display Click Based Trading and Mercury Display," filed Mar. 2, 2000, the contents of each of which are incorporated herein by reference for all purposes.

FIELD OF INVENTION

The present invention is directed to the electronic trading of commodities. Specifically, the invention provides a trader with a versatile and efficient tool for executing trades. It facilitates the display of and the rapid placement of trade orders within the market trading depth of a commodity, where a commodity includes anything that can be traded with quantities and/or prices.

BACKGROUND

At least 60 exchanges throughout the world utilize electronic trading in varying degrees to trade stocks, bonds, futures, options and other products. These electronic exchanges are based on three components: mainframe computers (host), communications servers, and the exchange participants' computers (client). The host forms the electronic heart of the fully computerized electronic trading system. The system's operations cover order-matching, maintaining order books and positions, price information, and managing and updating the database for the online trading day as well as nightly batch runs. The host is also equipped with external interfaces that maintain uninterrupted online contact to quote vendors and other price information systems.

Traders can link to the host through three types of structures: high speed data lines, high speed communications servers and the Internet. High speed data lines establish direct connections between the client and the host. Another connection can be established by configuring high speed networks or communications servers at strategic access points worldwide in locations where traders physically are located. Data is transmitted in both directions between traders and exchanges via dedicated high speed communication lines. Most exchange participants install two lines between the exchange and the client site or between the communication server and the client site as a safety measure against potential failures. An exchange's internal computer system is also often installed with backups as a redundant measure to secure system availability. The third connection utilizes the Internet. Here, the exchange and the traders communicate back and forth through high speed data lines, which are connected to the Internet. This allows traders to be located anywhere they can establish a connection to the Internet.

Irrespective of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run. The installation of open interfaces in the development of an exchange's electronic strategy means users can choose, depending on their trading style and internal requirements, the means by which they will access the exchange.

The world's stock, bond, futures and options exchanges have volatile products with prices that move rapidly. To profit in these markets, traders must be able to react quickly. A skilled trader with the quickest software, the fastest communications, and the most sophisticated analytics can significantly improve his own or his firm's bottom line. The slightest speed advantage can generate significant returns in a fast moving market. In today's securities markets, a trader lacking a technologically advanced interface is at a severe competitive disadvantage.

Irrespective of what interface a trader uses to enter orders in the market, each market supplies and requires the same information to and from every trader. The bids and asks in the market make up the market data and everyone logged on to trade can receive this information if the exchange provides it. Similarly, every exchange requires that certain information be included in each order. For example, traders must supply information like the name of the commodity, quantity, restrictions, price and multiple other variables. Without all of this information, the market will not accept the order. This input and output of information is the same for every trader.

With these variables being constant, a competitive speed advantage must come from other aspects of the trading cycle. When analyzing the time it takes to place a trade order for a given commodity, various steps contribute in different amounts to the total time required. Approximately 8% of the total time it takes to enter an order elapses between the moment the host generates the price for the commodity and the moment the client receives the price. The time it takes for the client application to display the price to the trader amounts to approximately 4%. The time it takes for a trade order to be transmitted to the host amounts to approximately 8%. The remainder of the total time it takes to place an order, approximately 80% is attributable to the time required for the trader to read the prices displayed and to enter a trade order. The present invention provides a significant advantage during the slowest portion of the trading cycle—while the trader manually enters his order. Traders recognize that the value of time savings in this portion may amount to millions of dollars annually.

In existing systems, multiple elements of an order must be entered prior to an order being sent to market, which is time consuming for the trader. Such elements include the commodity symbol, the desired price, the quantity and whether a buy or a sell order is desired. The more time a trader takes entering an order, the more likely the price on which he wanted to bid or offer will change or not be available in the market. The market is fluid as many traders are sending orders to the market simultaneously. It fact, successful markets strive to have such a high volume of trading that any trader who wishes to enter an order will find a match and have the order filled quickly, if not immediately. In such liquid markets, the prices of the commodities fluctuate rapidly. On a trading screen, this results in rapid changes in the price and quantity fields within the market grid. If a trader intends to enter an order at a particular price, but misses the price because the market prices moved before he could enter the order, he may lose hundreds, thousands, even millions of dollars. The faster a trader can trade, the less likely it will be that he will miss his price and the more likely he will make money.

SUMMARY

The inventors have developed the present invention which overcomes the drawbacks of the existing trading systems and dramatically reduces the time it takes for a trader to place a trade when electronically trading on an exchange. This, in turn, increases the likelihood that the trader will have orders filled at desirable prices and quantities.

Click based trading, as described herein and specifically the "Click" and "Dime" methods of the present invention, enables a trader to execute single mouse click trades for large volumes of commodities at a price within a pre-specified range.

Specifically, the present invention is directed to a method and system for placing a trade order for a commodity on an electronic exchange using a client system with a user input device and with preset parameters for trade orders. The invention includes displaying a market depth of the commodity through a dynamic display of prices and quantities of a plurality of bids and asks in the market for the commodity. The invention also includes initiating placement of a trade order of the commodity in response to a single action of the user input device with a pointer of the user input device positioned over an area in the dynamic display. The contents of the trade order are based in part upon the preset parameters and the position of the pointer at the time of the single action by the user.

These embodiments, and others described in greater detail herein, provide the trader with improved efficiency and versatility in placing, and thus executing, trade orders for commodities in an electronic exchange. Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE FIGURES

FIG. 2 illustrates screen display showing the inside market and the market depth of a given commodity being traded;

FIG. 3 illustrates an entire trading window screen display including the display of market depth;

FIG. 7 illustrates an entire trading window screen display including the display of market depth in which the Dime trading feature is enabled;

FIG. 9 is a screen display illustrating the incorporation of theoretical values into the system of the present invention.

DETAILED DESCRIPTION

As described with reference to the accompanying figures, the present invention provides a method and system for display of a traded commodity's market depth and for facilitating rapid placement of trade orders within the market depth. A commodity's market depth is the current bid and ask prices and quantities in the market. The invention increases the likelihood that the trader will be able to execute orders at desirable prices and quantities.

In the preferred embodiment, the present invention is implemented on a computer or electronic terminal. The computer is able to communicate either directly or indirectly (using intermediate devices) with the exchange to receive and transmit market, commodity, and trading order information. It is able to interact with the trader and to generate contents and characteristics of a trade order to be sent to the exchange. It is envisioned that the system of the present invention can be implemented on any existing or future terminal or device with the processing capability to perform the functions described herein. The scope of the present invention is not limited by the type of terminal or device used. Further, the specification refers to a single click of a mouse as a means for user input and interaction with the terminal display as an example of a single action of the user. While this describes a preferred mode of interaction, the scope of the present invention is not limited to the use of a mouse as the input device or to the click of a mouse button as the user's single action. Rather, any action by a user within a short period of time, whether comprising one or more clicks of a mouse button or other input device, is considered a single action of the user for the purposes of the present invention.

Figure 1:
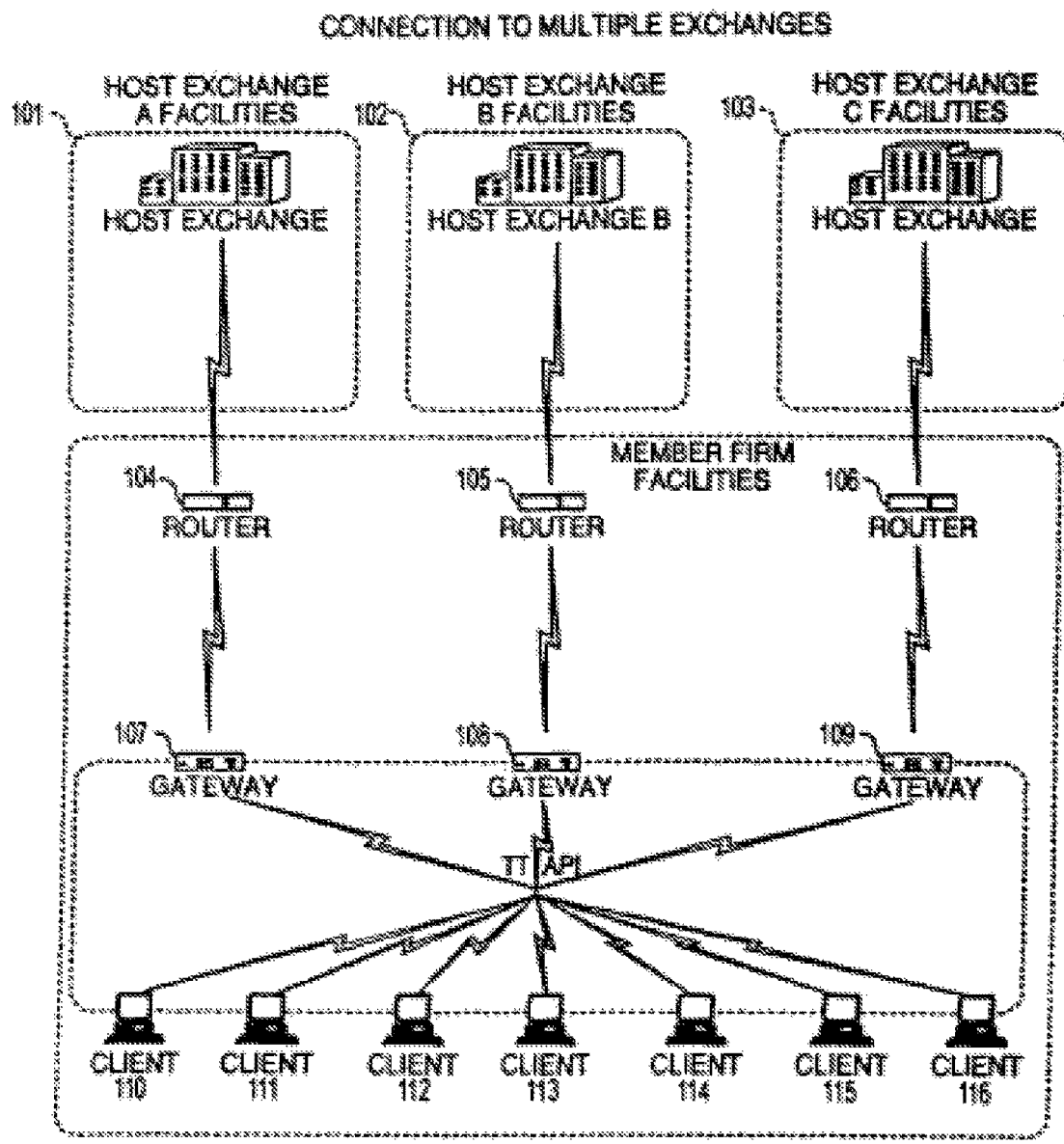
FIG. 1 illustrates the network connections between multiple exchanges and client sites.

The system can be configured to allow for trading in a single or in multiple exchanges simultaneously. Connection of the system of the present invention with multiple exchanges is illustrated in FIG. 1. This figure shows multiple host exchanges 101-103 connected through routers 104-106 to gateways 107-109. Multiple client terminals 110-116 for use as trading stations can then trade in the multiple exchanges through their connection to the gateways 107-109. When the system is configured to receive data from multiple exchanges, then the preferred implementation is to translate the data from various exchanges into a simple format. This "translation" function is described below with reference to FIG. 1. An applications program interface ("TT API" as depicted in the figure) translates the incoming data formats from the different exchanges to a simple preferred data format. This translation function may be disposed anywhere in the network, for example, at the gateway server, at the individual workstations or at both. In addition, the storage at gateway servers and at the client workstations, and/or other external storage cache historical data such as order books which list the client's active orders in the market; that is, those orders that have neither been filled nor cancelled. Information from different exchanges can be displayed at one or in multiple windows at the client workstation. Accordingly, while reference is made through the remainder of the specification to a single exchange to which a trading terminal is connected, the scope of the invention includes the ability to trade, in accordance with the trading methods described herein, in multiple exchanges using a single trading terminal.

The preferred embodiments of the present invention include the display of "Market Depth" and allow traders to view the market depth of a commodity and to execute trades within the market depth with a single click of a computer mouse button. Market Depth represents the order book with the current bid and ask prices and quantities in the market. In other words, Market Depth is each bid and ask that was entered into the market, subject to the limits noted below, in addition to the inside market. For a commodity being traded, the "inside market" is the highest bid price and the lowest ask price.

The exchange sends the price, order and fill information to each trader on the exchange. The present invention processes this information and maps it through simple algorithms and mapping tables to positions in a theoretical grid program or any other comparable mapping technique for mapping data to a screen. The physical mapping of such information to a screen grid can be done by any technique known to those skilled in the art. The present invention is not limited by the method used to map the data to the screen display.

How far into the market depth the present invention can display depends on how much of the market depth the exchange provides. Some exchanges supply an infinite market depth, while others provide no market depth or only a few orders away from the inside market. The user of the present invention can also chose how far into the market depth to display on his screen.

Figures 2, 3:
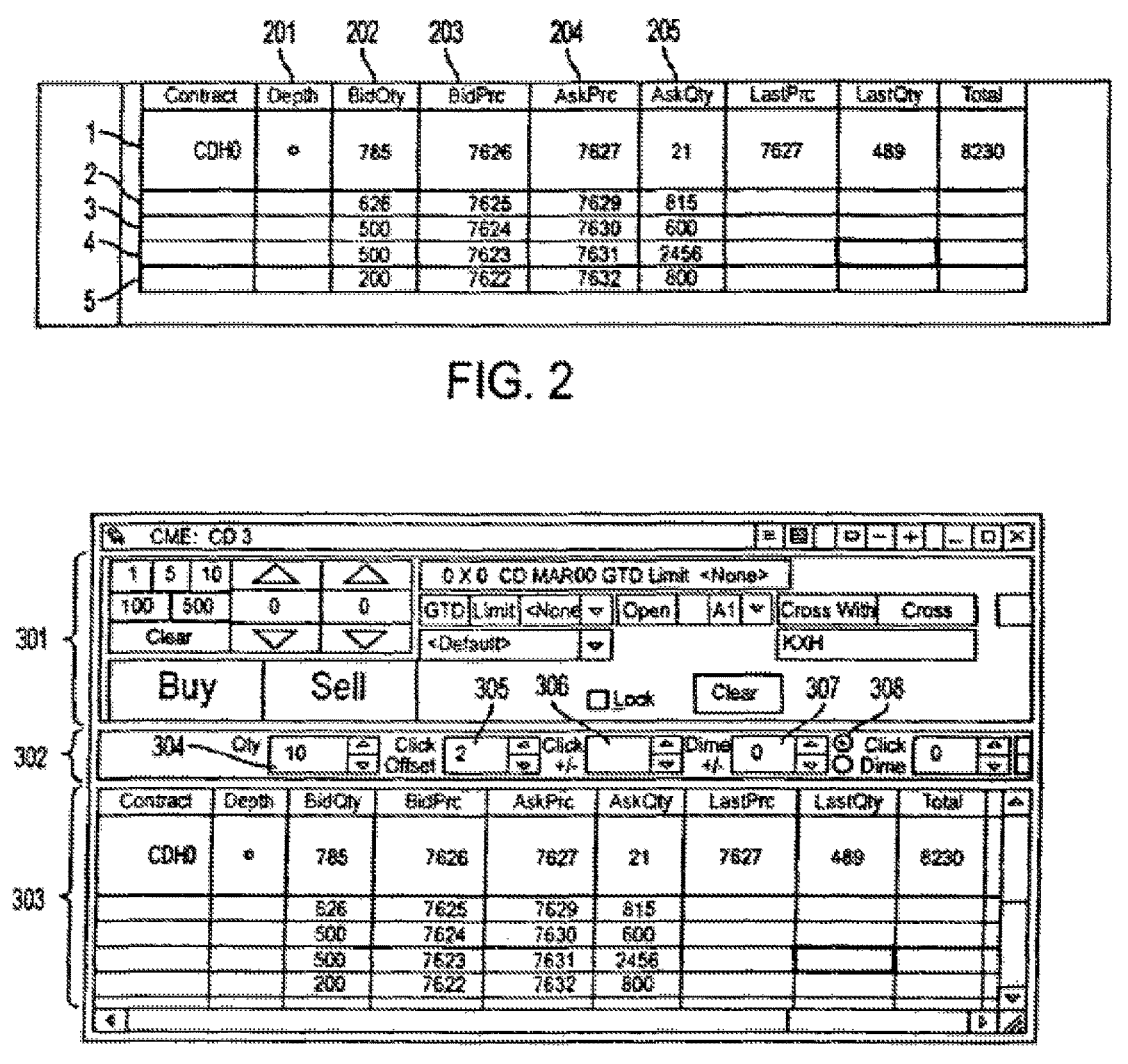

FIG. 2 illustrates a screen display of the present invention showing the inside market and the market depth of a given commodity being traded. Row 1 represents the "inside market" for the commodity being traded which is the best (highest) bid price and quantity and the best (lowest) ask price and quantity. Rows 2-5 represent the "market depth" for the commodity being traded. In the preferred embodiment of the present invention, the display of market depth (rows 2-5) lists the available next-best bids, in column 203, and asks, in column 204. The working bid and ask quantity for each price level is also displayed in columns 202 and 205 respectively (inside market—row 1). Prices and quantities for the inside market and market depth update dynamically on a real time basis as such information is relayed from the market.

In the screen display shown in FIG. 2, the commodity (contract) being traded is represented in row 1 by the character string "CDH0". The Depth column 208 will inform the trader of a status by displaying different colors. Yellow indicates that the program application is waiting for data. Red indicates that the Market Depth has failed to receive the data from the server and has "timed out." Green indicates that the data has just been updated. The other column headings in this and all of the other figures, are defined as follows. BidQty (Bid Quantity): the quantity for each working bid, BidPrc (Bid Price): the price for each working bid, AskPrc (Ask Price): the price for each working ask, AskQty (Ask Quantity): the quantity for each working ask, LastPrc (Last Price): the price for the last bid and ask that were matched in the market and LastQty (Last Quantity): the quantity traded at the last price. Total represents the total quantity traded of the given commodity.

The configuration of the screen display itself informs the user in a more convenient and efficient manner than existing systems. Traders gain a significant advantage by seeing the market depth because they can see trends in the orders in the market. The market depth display shows the trader the interest the market has in a given commodity at different price levels. If a large amount of bids or asks are in the market near the trader's position, he may feel he should sell or buy before the inside market reaches the morass of orders. A lack of orders above or below the inside market might prompt a trader to enter orders near the inside market. Without seeing the market depth, no such strategies could be utilized. Having the dynamic market depth, including the bid and ask quantities and prices of a traded commodity aligned with and displayed below the current inside market of the commodity conveys the information to the user in a more intuitive and easily understandable manner. Trends in the trading of the commodity and other relevant characteristics are more easily identifiable by the user through the use of the present invention.

Various abbreviations are used in the screen displays, and specifically, in the column headings of the screen displays reproduced herein. Some abbreviations have been discussed above. A list of common abbreviations and their meanings is provided in Table 1.

TABLE I

Abbreviations

| COLUMN | DESCRIPTION | COLUMN | DESCRIPTION |
| --- | --- | --- | --- |
| Month | Expiration Month/Year | TheoBid | Theoretical Bid Price |
| Bid Mbr(1) | Bid Member ID | TheoAsk | Theoretical Ask Price |
| WrkBuys(2) | Working Buys for entire Group ID | QAct | Quote Action (Sends individual quotes) |
| BidQty | Bid Quantity | BQQ | Test Bid Quote Quantity |
| ThrshBid(6) | Threshold Bid Price | BQP | Test Bid Quote Price |
| BidPrc | Bid Price | Mkt BQQ | Market Bid Quote Quantity |
| Bid Qty Accum | Accumulated Bid Quantity | Mkt BQP | Market Bid Quote Price |
| BidPrc Avg | Bid Price Average | Quote | Checkbox activates/deactivates contract for quoting |
| AskPrc Avg | Ask Price Average | Mkt AQQ | Market Ask Quote Quantity |
| AskQty Accum | Accumulated Ask Quantity | Mkt AQP | Market Ask Quote Price |
| AskPrc | Ask Price | AQP | Ask Quote Price |
| ThrshAsk(6) | Threshold Ask Price | AQQ | Ask Quote Quantity |
| AskQty | Ask Quantity | Imp BidQty(5) | Implied Bid Quantity |
| WrkSells(2) | Working Sells for entire Group ID | Imp BidPrc(5) | Implied Bid Price |
| Ask Mbr(1) | Ask Member ID | Imp AskQty(5) | Implied Ask Quantity |
| NetPos | Net Position | Imp AskPrc(5) | Implied Ask Price |
| FFNetPos | Fast Fill Net Position | Gamma(3) | Change in Delta given 1 pt change in underlying |

TABLE I-continued

Abbreviations

| COLUMN | DESCRIPTION | COLUMN | DESCRIPTION |
|---|---|---|---|
| LastPrc | Last Price | Delta(3) | Change in price given 1 pt change in underlying |
| LastQty | Last Quantity | Vola(3) | Percent volatility |
| Total | Total Traded Quantity | Vega(3) | Price change given 1% change in Vola |
| High | High Price | Rho(3) | Price change given 1% change in interest rate |
| Low | Low Price | Theta(3) | Price change for every day that elapses |
| Open | Opening Price | Click Trd | Activate/deactivate click trading by contract |
| Close | Closing Price | S (Status) | Auction, Closed, FastMkt, Not Tradable, Pre-trading, Tradable, S = post-trading |
| Chng | Last Price-Last Close | Expiry | Expiration Month/Year |
| TheoPrc | Theoretical Price | | |

Click based trading enables a trader to execute trades with a single mouse click within the market depth. The trader inputs a quantity and price range once and then sends orders to market with one click on a price field in the Market Depth grid. In the preferred embodiment of the present invention, a trader using click based trading would be presented with a screen display similar that that shown in FIG. 3. This figure shows an entire trading window screen display, including the display of market depth as described with respect to FIG. 2. The portion of the display shown in FIG. 3 identified as area 301 shows various trading information and options which are not pertinent in the description of the present invention. Area 303 is the display of the inside market and the market depth as described above. Area 302 provides the trader with the necessary options to perform click based trading under the present invention.

Under the present invention, there are at least two modes of click based trading; that is, there are at least two types of trade orders that can be placed using click based trading. These are "Click" trades and "Dime" trades. Both allow the trader to trade large quantities of a commodity within the market depth or the inside market with a single mouse click. Generally, "Click" trades are used to quickly execute trade orders within a preset range with respect to the last traded price or within a preset range from the actual bid or ask price clicked by the user. "Dime" trades are used to quickly join the existing market at a chosen level. Each of these types of trades is discussed in detail herein along with corresponding examples.

Area 302 in FIG. 3 shows the various parameters that can be adjusted by the user when performing click based trading under the present invention. The amount shown in the "QTY" 304 box represents the amount of the commodity to be traded. The "Click Offset" amount 305 and the "Click +/−" amount 306 are used in performing click trades. The "Dime +/−" 307 amount is used in performing dime trades. The round buttons 308 next to the words "Click" and "Dime" are used to enable either click or dime trading. By setting these parameters, the user is enabled to place trades based on multiple variables with just a single click in the market depth of the commodity. Note that the elements in area 302 have been arranged in a preferred configuration. However, the invention encompasses moving the area 302 to a different location, or displaying the elements in area 302 vertically or at an angle, or separating the different elements to create a plurality of different areas 302.

Figure 4:
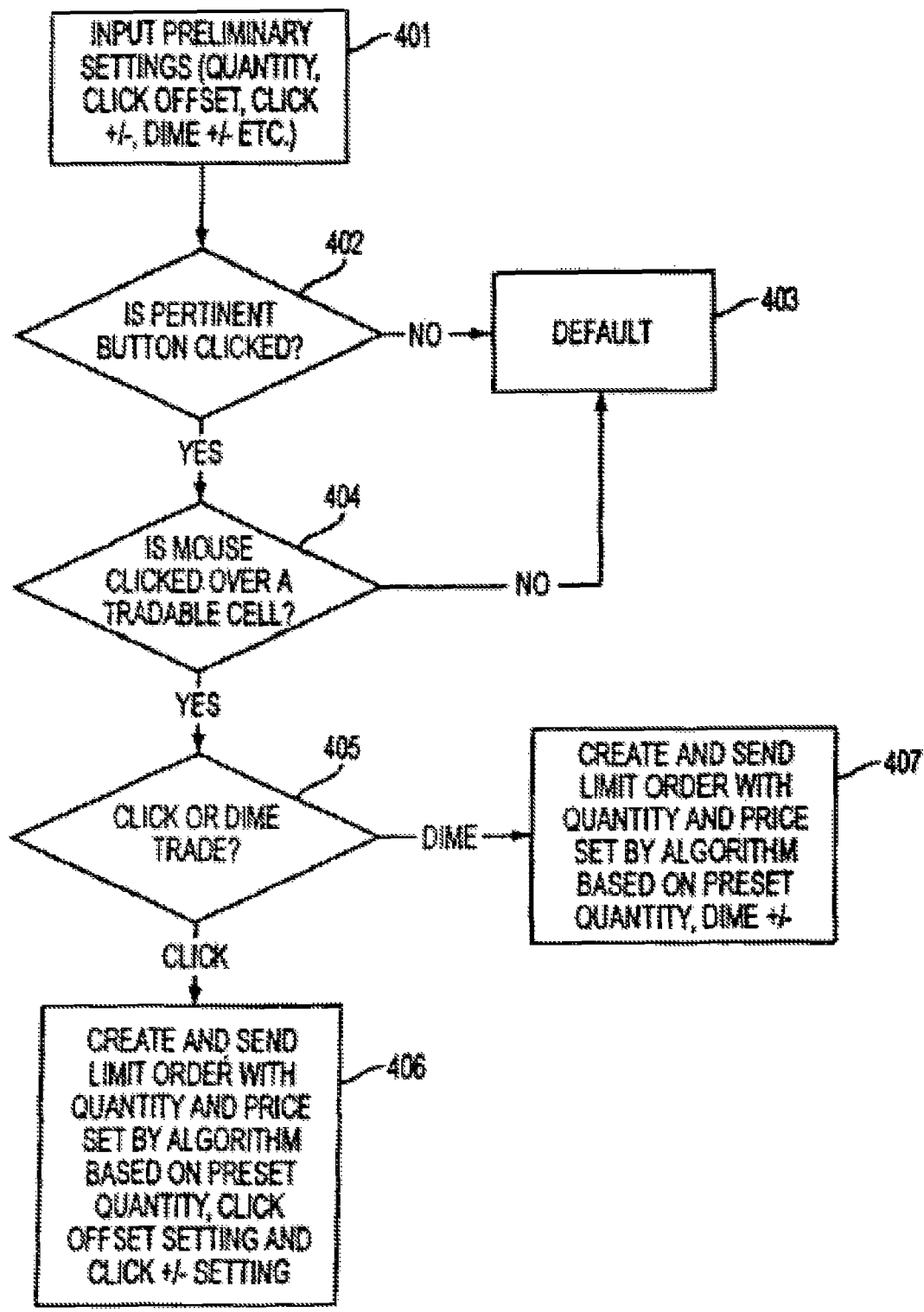
FIG. 4 is a flowchart illustrating the process of Click and Dime trading.

The basic operation of the system in performing click based trading and reacting to user inputs on a screen such as that shown in FIG. 3 is shown via the flowchart of FIG. 4. In step 401 of the process, the preliminary settings are input as discussed above with respect to the screen display in FIG. 3 and area 302. In step 402, the system determines whether a pertinent button has been clicked on a mouse or some other form of input device indicating that the user is initiating the placement of a trade order. If the system determines that a pertinent button was clicked, the system then determines, in step 404, whether the mouse pointer was positioned over a tradeable cell on the screen display when the button was clicked. Tradeable cells include those in area 303 under the four bid and ask columns 202-205. If a pertinent button was not clicked or if the mouse pointer was not positioned over a tradeable cell, the system does not attempt to place a click based trade order and, in step 403 returns to a default condition, such as displaying market information and awaiting initiation of a trade order. If, however, a pertinent button was clicked over a tradeable cell, in step 405 the system checks to determine whether a click trade is requested or a dime trade is requested. In the preferred embodiment of the present invention, this determination is made based on which button ("Click" or "Dime") has been selected on the screen display in area 302. As will be seen in the description of other embodiments of the invention, this determination can also be made based upon which mouse button has been depressed. If it is determined that a click trade is requested, the system, in step 406, creates and sends a limit order to the exchange with the quantity and price set in accordance with an algorithm (discussed herein) based on the preliminary settings and the market prices. Similarly, if it is determined that a dime trade is requested, the system, in step 407, creates and sends a limit order to the exchange with the quantity and price set in accordance with a separate algorithm.

Next, placement of click trades under the present invention, as opposed to dime trades, is described with reference to the screen displays of FIGS. 3 and 5. Using the various parameters, traders can use the present invention to implement various trading strategies. Described herein are two such strategies based on two embodiments of the present invention and its provisions for placing click trades. The first involves the use of the "Click +/−" feature of the invention. Trading with Click +/− allows a trader to chase a fast moving market up to a certain amount of ticks. A trader would set the number of ticks in the Click +/− field once. He would then be able to send orders to market with a single click in the market depth for a price up to (or down to if selling) the price clicked plus (or minus if selling) the number of ticks in the Click +/− field. A "tick" is the minimum change in a price value that is set by the exchange for each commodity (for example, $0.01, $0.05, $0.10 or any other value). The best available order in the market within the preset parameters would be filled.

If the market was moving quickly and the inside market was rapidly increasing or decreasing (or both alternatively), use of Click +/− will insure that the trader can keep up with the changes. Using the traditional electronic trading method, he might not be able to sell or buy large quantities at or near the price he needs because the price moved before he could enter all of the required data. Using Click +/−, he can trade pre-specified quantities at any chosen price plus or minus the number of ticks chosen. This makes it more likely that his trades will get filled in a rapidly changing market before the market moves away.

The following equations are used to exemplify how the system would determine at what price an order should be placed. The following abbreviations are used in the formulas: Ask Price clicked with Click trading button=A, Bid Price clicked with Click trading button=B, Click +/− value=C, Quantity=Q, Buy limit order sent to the market=Bo and Sell limit order sent to the market=So.

$$\text{If } C>0 \text{ then } Bo=(A+C)Q \quad \text{(Eq. 1)}$$

$$\text{If } C>0 \text{ then } So=(B-C)Q \quad \text{(Eq. 2)}$$

If the user has set the Click +/− value to 0, the Click +/− feature is essentially disabled and the Click Offset feature is enabled (discussed herein).

Figure 5:
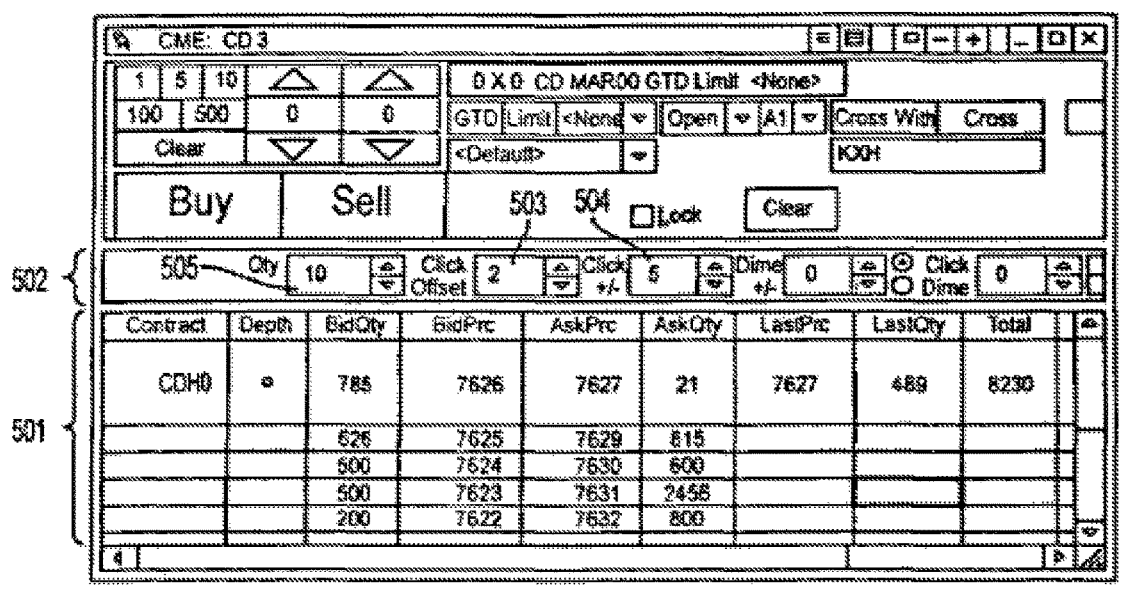
FIG. 5 illustrates an entire trading window screen display including the display of market depth in which the Click +/− feature is enabled.

Referring now to the screen display shown in FIG. 5, the "Click Offset" 502 feature is disabled since a "Click +/−" 504 amount greater than 0 is entered. In the case shown, the Click +/− amount is set to "5". This entry will enable the trader to trade at any price he clicks in the market grid area 501 and enter an order for up to (or down to if selling) 5 ticks above (or below) the clicked price. Using the values shown in the screen display of FIG. 5, the placement of click trades using the Click +/− feature is now described using examples. In these examples, and as shown in FIG. 5, the QTY 505 is 10 and the Click +/− 504 value is 5.

Suppose the trader seeks to sell 10 lots of the commodity. He clicks on the 7623 Bid Price, which is three rows below the inside market. This will send a limit order to the exchange to sell 10 lots for as low as 7618 (7623 minus 5 ticks). The best available price will be filled first. Thus, in this scenario, all 10 lots will be filled because bids exist in the marketplace in this price range and the quantities amount to many more than 10 lots. Because the best BidPrc will be used, the 10 lots will be sold at 7626, if it is still available when the order is made.

Suppose the trader seeks to buy 10 lots of the commodity. He clicks on the 7630 Ask Price, which is two rows above the inside market. This will send a limit order to the exchange to buy 10 lots at the best prices available for as much as 7635 (7630 plus 5 ticks). This order will also be filled because offers exist in the marketplace in this price range and the quantities amount to many more than 10 lots.

There is also a safety mechanism in the present invention that can be used when placing click trades. This feature is known as "Click Offset" and it prevents an order from being placed at a price that is too far from the last traded price of the commodity. Effectively, the trader establishes a floor or ceiling above or below the last traded price by enabling Click Offset. To use the Offset feature, a trader would set the Click +/− value to zero. He would then set a figure in the Click Offset field. This will halt any orders that are above or below the last traded price by at least the number of ticks in the Click Offset field. As mentioned above, a "tick" is the minimum change in a price value that is set by the exchange for each commodity (for example, $0.01, $0.05, $0.10 or any other value). Using Click Offset a trader could trade in the market depth, but no order would be sent to market that is entered by the trader for a price further from the last price than the figure displayed in the Click Offset field.

Without the Click Offset feature, a trader might intend to click on a particular price but, between the time he decides to do so and the time he actually clicks (which may be only hundredths of a second), the price may change. He may not be able to stop the downward motion of his finger and the order would be sent to market at an incorrect or undesired price. Sometimes the change in price is significant and could cost the trader a lot of money. Alternatively, the mouse pointer may inadvertently be improperly positioned when the trader clicks which, without the Click Offset feature, would also send an order at an incorrect or undesirable price.

The following equations are used to exemplify how the system would determine whether an order should be placed when the Click Offset feature is used. The following abbreviations are used in these formulas: Ask Price clicked with Click trading button=A, Bid Price clicked with Click trading button=B, Last Traded Price=L, Click Offset value=CO, Click +/− value=C, Quantity=Q, Buy limit order sent to the market=Bo and Sell limit order sent to the market=So.

$$\text{If } C=0 \text{ and if absolute value of } (L-A)>CO \text{ then NO ORDER SENT} \quad \text{(Eq. 3)}$$

$$\text{If } C=0 \text{ and if absolute value of } (L-B)>CO \text{ then NO ORDER SENT} \quad \text{(Eq. 4)}$$

$$\text{If } C=0 \text{ and if absolute value of } (L-A)\leq\text{Off then } Bo=(A)Q \quad \text{(Eq. 5)}$$

$$\text{If } C=0 \text{ and if absolute value of } (L-B)\leq\text{Off then } So=(B)Q \quad \text{(Eq. 6)}$$

Referring now to the screen display shown in FIG. 3, the "Click Offset" feature is enabled since the "Click +/−" amount is set to 0 (blank). In the case shown, the Click Offset amount is set to "2". This entry will enable the trader to trade at any price he clicks in the market grid area 301 so long as it is within two ticks from the last price (LastPrc) 7627. Using the values shown in the screen display of FIG. 3, the placement of click trades using the Click Offset feature is now described using examples. In these examples, and as shown in FIG. 3, the QTY is 10, the Click Offset value is 2 and the last price at which the commodity was traded is 7627.

Suppose the trader wishes to buy 10 lots. The last traded price is 7627 so the trader might right click on 7629, which is one row below the inside market ask price. This would send a buy limit order to the market for his previously entered quantity (10 in the screen display of FIG. 3) for a price of 7629. Because this is within two ticks of the last traded ask price, the order would go to the market. All 10 lots would be filled because there are 836 (815 plus 21) lots in the market at least at this price. If, however, the trader clicked on 7630 or higher, the system would not allow a trade order to be generated because the price is greater than two ticks above the last traded price.

Both of the Click +/− and the Click Offset features of placing click trades in the present invention as described above are shown in the flowchart of FIG. 6. First, in step 601, the system determines whether a click trade has been requested. This step connects with step 406 of FIG. 4. In one embodiment, as discussed above and as shown in box 601, determination that a click trade is requested can be based, in part, on which mouse button was depressed. In step 602, the system determines whether a buy or a sell order is requested based upon whether a price has been clicked in the Ask column or in the Bid column. A click in the Bid column indicates that the trader is initiating a sell order wherein the system then moves to step 603. A click in the Ask column indicates that the trader is initiating a buy order wherein the system then moves to step 604.

The system, in each of steps 603 and 604 determines whether the Click +/− feature is being used by checking whether the Click +/− value is set to 0 or whether it is set to a number greater than 0. If, in 603 it is determined that the Click +/− value is set to greater than 0, the system then creates, in step 605, a sell limit order for the preset quantity and a price equal to the Bid price clicked minus the Click +/− value (see Eq. 2). The sell limit order is sent to the market. Similarly, if in step 604 it is determined that the Click +/− value is set to greater than 0, the system then creates, in step 606, a buy limit order for the preset quantity and for a price equal to the Ask price clicked plus the Click +/− setting (see Eq. 1). The buy limit order is sent to the market.

Figure 6:
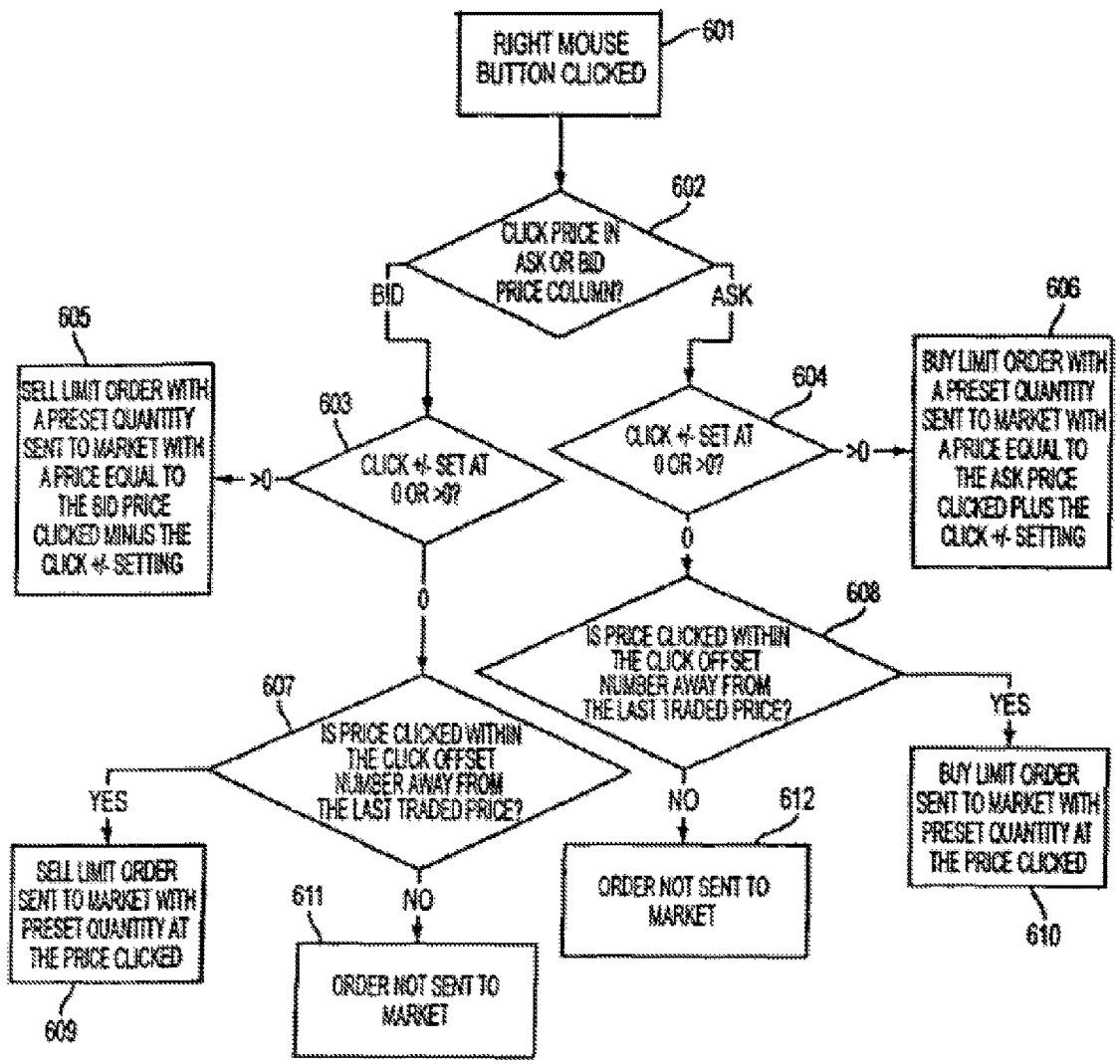
FIG. 6 is a flowchart illustrating the process of Click trading.

The following describes the use of the Click Offset feature of the present invention with reference to the flowchart of FIG. 6. If in step 603 it is determined that the Click +/− value is 0, the system moves to step 607. Similarly, if in step 604 it is determined that the Click +/− value is 0, the system moves to step 608. In each of steps 607 and 608, the system determines whether to allow the buy or sell trade order to be sent to the market. In these steps, the system determines whether the price clicked is within the Click Offset value away from the last trade price of the commodity. If, in step 607, the system determines that the price clicked is within the Click Offset value away from the last trade price of the commodity, then, in step 609 (see Eq. 6), it creates a sell limit order for the preset quantity at the Bid price clicked. If not, then, in step 611 (see Eq. 4), no trade order is sent to the market and the trader's attempt to place a trade is prevented. Similarly, if in step 608, the system determines that the price clicked is within the Click Offset value away from the last trade price of the commodity, then, in step 610 (see Eq. 5), it creates a buy limit order for the preset quantity at the Ask price clicked. If not, then, in step 612 (see Eq. 3), no trade order is sent to the market and the trader's attempt to place a trade is prevented.

Figure 8:
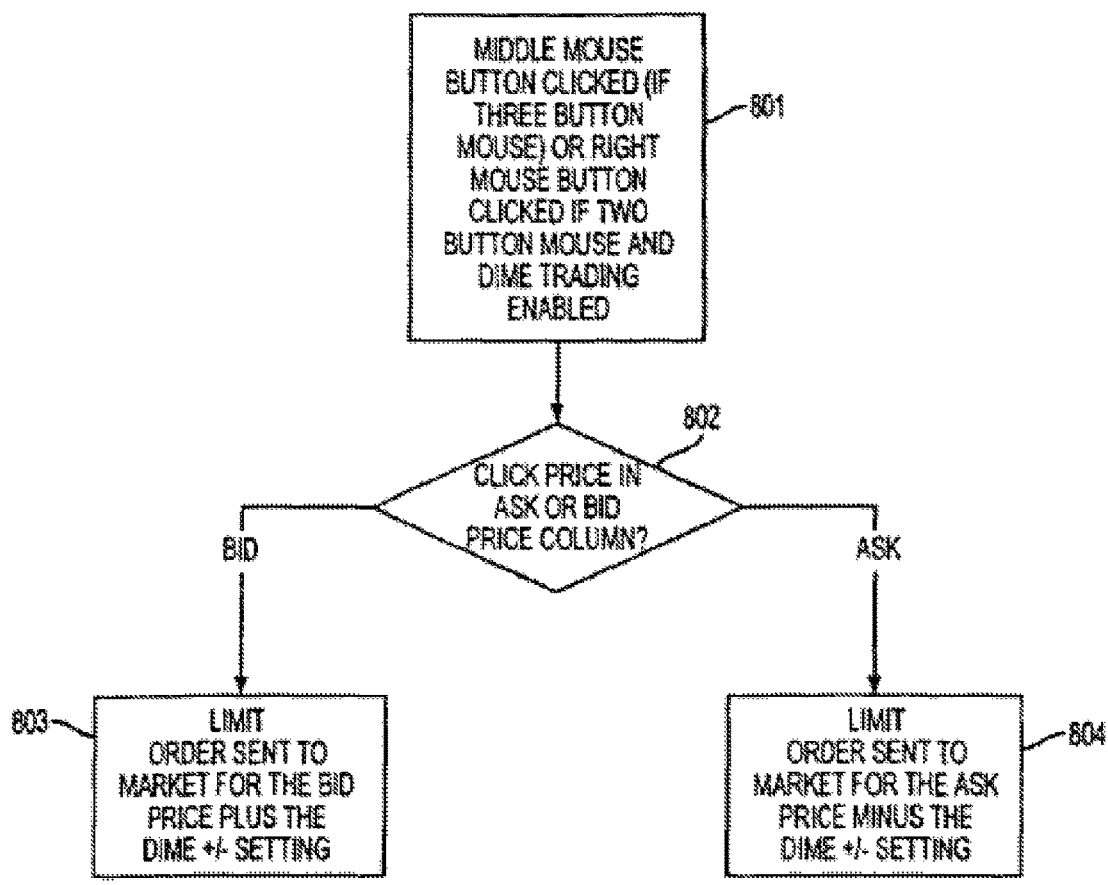
FIG. 8 is a flowchart illustrating the process of Dime trading.

Next, placement of dime trades under the present invention, as opposed to click trades, is described with reference to the screen display of FIG. 7 and the flowchart of FIG. 8. Dime trading allows traders to join the market at a value above or below the best bid or ask by a specified number. Using Dime +/−, a trader can enter orders into the market that will not be filled until an equal match met the order in the market. The trader selects the quantity as he did when click trading, and enters the tick amount in the "Dime +/−" field. A setting of zero ("0") ticks will enter an order for the price clicked. A tick setting of any amount greater than or less than zero ("0") sends an order to the market for the price clicked plus (minus if selling) the Dime +/− setting. If the trader clicked on the Bid order column, a bid would be sent, while a click on the Ask column would send an ask order. This type of trading may be utilized to join the market or even to move the prevailing market prices up or down.

The following equations are used to exemplify how the system would determine at what price an order should be placed when using Dime trading. The following abbreviations are used in these formulas: Ask Price clicked with Dime trading button=A, Bid Price clicked with Dime trading button=B, Dime +/− value=D, Quantity=Q, Buy limit order sent to the market=Bo and Sell limit order sent to the market=So.

$$Bo=(B+D)Q \qquad (Eq. 7)$$

$$So=(A-D)Q \qquad (Eq. 8)$$

Figure 7:
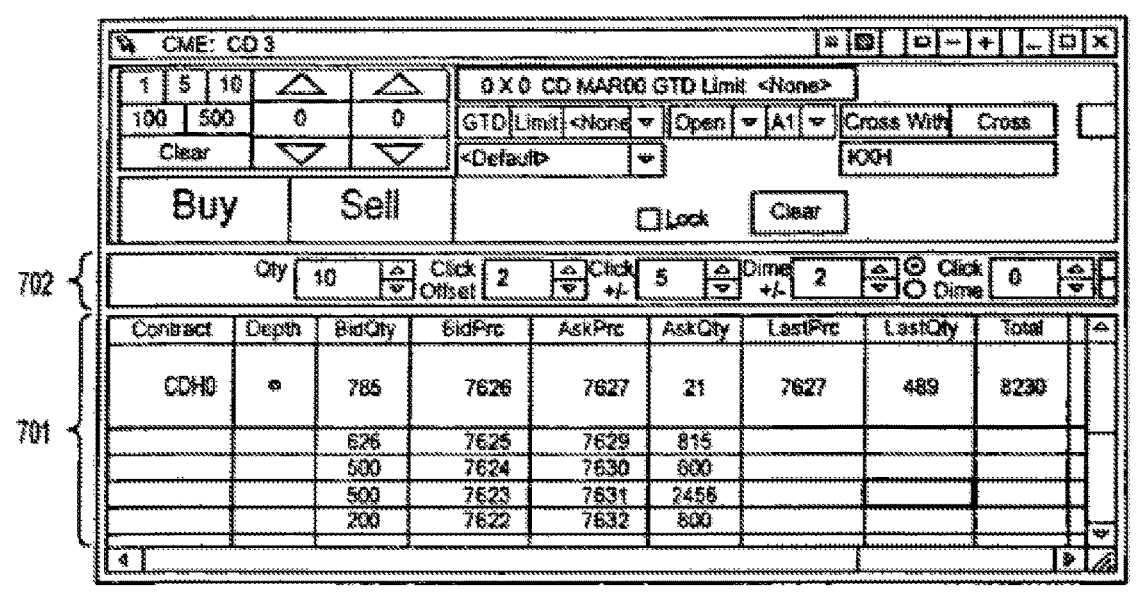

Using the values shown in the screen display of FIG. 7, the placement of dime trades is now described using examples. In these examples, and as shown in area 702 of FIG. 7, the QTY is 10, the Dime +/− value and the Dime button has been selected. Suppose the trader wishes to join in the market with those wishing to buy a commodity at a certain price. In this screen, the trader might click in area 701 on 7622, which is four rows below the inside market bid price. This would send a buy order to the market for his previously entered quantity (10 in the screen display of FIG. 7) for a price of 7624 or better (up to two ticks above the clicked price). Nothing would be filled at this point. Rather, the orders would be placed in the market as a Bid limit order at a price of 7624 and would only be filled if an Ask order entered the market for a price of 7624 or better (lower).

Suppose that the Dime +/− was set to a negative number, for example −3. In this case, a click on 7622 in the BidPrc column would enter a Bid limit order for a price of 7619. None of these would be filled in the market until and unless the Ask orders enter the market for a price of 7619 or better (lower).

The process for placing dime trades in the present invention as described above are shown in the flowchart of FIG. 8. First, in step 801, the system determines whether a dime trade has been requested. This step connects with step 407 of FIG. 4. In one embodiment, as discussed above and as shown in box 801, determination that a dime trade is requested can be based, in part, on which mouse button was depressed. In step 802, the system determines whether the trader wants to join the market of buy orders or of sell orders for the commodity based upon whether a price has been clicked in the Bid column or in the Ask column. A click in the Bid column indicates that the trader is initiating a buy order and the system then moves to step 803. A click in the Ask column indicates that the trader is initiating a sell order and the system then moves to step 804. In step 803, the system creates a buy limit order at a price equal to the Bid price clicked plus the Dime +/− amount (see Eq. 7). The order is sent to the exchange. In step 804, the system creates a sell limit order at price equal to the Ask price clicked minus the Dime +/− amount (see Eq. 8). The order is sent to the exchange. In this way, the trader can easily join the market for a given commodity by entering orders into the market that will not be filled until an equal match met the order in the market.

Other features of the present invention, applicable to both click and to dime trading are now described. Reference is made to FIG. 3, and specifically in area 302, to the fields containing values, including the QTY 304, the Click Offset 305, the Click +/− 306 and the Dime +/− 307 fields. The values in these fields can be set by typing in the numbers through a keyboard or by clicking on the up and down arrows to increment or decrement the value within the corresponding field. In the present invention, however, there is a third way to adjust the values in these fields which furthers the goal of reducing the amount of time required to place trade orders. The values in these fields can be adjusted by simply positioning the mouse pointer in the desired field and clicking a button. In the preferred embodiment of the invention, a click of the left mouse button causes the value in the field the increment by 1 and a click of the right mouse button causes the value to decrement by 1. This functionality is accomplished by including programming to cause clicks of certain of the mouse buttons to provide the above-described incrementing only when the mouse is detected above these fields.

In one embodiment of the present invention, a two-button mouse is used by the trader to make selections on the screen and initiate trade orders. In this case, as discussed above, the user selects whether he wishes to be initiating click trades or dime trades by selecting the appropriate button in area 302. Once selected, the right button of the mouse is used to initiate as many click or dime trades as the trader desires, depending on which mode is selected, by clicking on an Ask or Bid price in area 303. In another embodiment of the invention, a three-button mouse is used by the trader. This eliminates the need to select either the click button or the dime button since both types of trades can be executed from the mouse at any given time. Using a three-button mouse, and with the mouse pointer positioned over a tradeable cell as described above, a trader could place a dime trade with a single click of the middle mouse button and place a click trade with a single click of the right mouse button. This embodiment of the present invention also furthers the goal of reducing the amount of time required to place trade orders since it eliminates the time necessary to switch between click and dime modes of trading.

Figure 9:
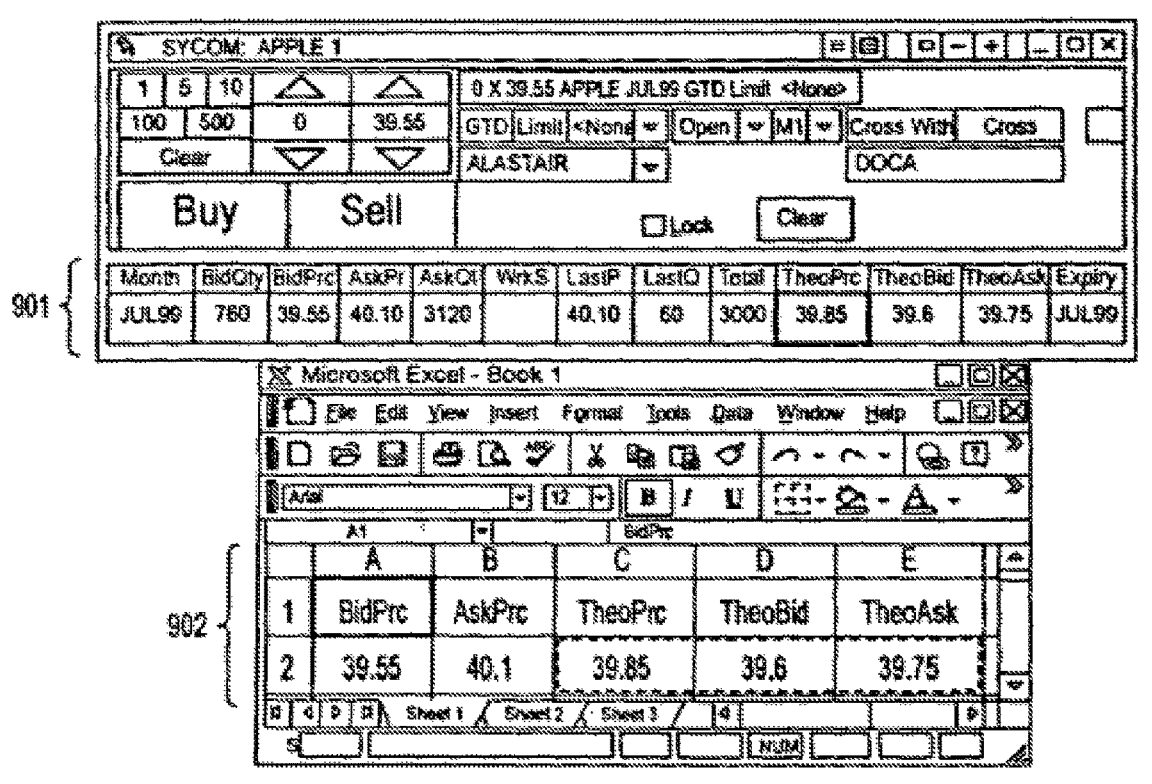

Another feature of the present invention involves the use of theoretical trading prices as well as theoretical ask and bid prices. Such theoretical values can assist the trader in deciding whether to place trades and, in the present invention, can be used to prevent the trader from placing trades that are outside of the parameters defined by the theoretical values. These theoretical values are pre-determined and may be calculated by an external program or algorithm. The values are imported into the present system automatically or can be entered by the trader. FIG. 9 shows a screen display where, in area 902, values generated from a spreadsheet 902 are imported into the present system and shown in area 901. A screen button "Theo" (not shown) can be clicked to enable the use of the Theoretical Value in click trading. Thus, the trader's click trades would then be restricted by this value and no order would be sent that was not as good or better than the theoretical value. This value would be applied irrespective of whether the trader attempted to buy or sell. Thus, if the theoretical value was 102 and the trader attempted to click trade in the BidPrc column at 101, no order would be sent because the clicked value was worse than the theoretical value. Clicks on 102, 103, 104 or higher in the BidPrc column would be allowed because these would send sell orders as good as or better than the theoretical value.

Separate Theoretical Bid and Ask prices can also be used. This feature can be enabled by clicking on a screen button "B/A" (Bid/Ask—not shown). A separate theoretical value could be established for each bid and ask in accordance with predetermined algorithms based on various parameters. This is shown in FIG. 9 as TheoBid and TheoAsk. Separate bid and ask theoretical values can also be established for each row in the market depth. Each attempted bid or ask order would be checked against each corresponding theoretical bid or ask value. If the clicked price is as good or better than the corresponding Bid or Ask theoretical value, only then will the order be sent.

An additional feature of the present invention relating to the use of theoretical values is the ability to modify "edge". Traders may edge their trades away from the theoretical values described above. When either the Theo or B/A screen buttons are clicked enabled, a white field (not shown) appears in a box adjacent to "Theo" and "B/A." Traders can input a number of ticks here which allows them to prevent orders from being placed that are not better than the corresponding theoretical value by the amount of ticks entered. For example, with a 12.2 theoretical value, a 12.6 market bid, and an edge value of 4 ticks, a trader's order to sell at the market bid price will pass the edge test and the trade order will be sent. But, if the bid moved one tick lower to 12.5, an attempt to sell would fail the edge test, because only 3 ticks of edge would be made on the trade and, thus, no trade order would be sent. Edge trading can also be used with the Click +/− setting. A trader who sets the Click +/− value to 4 ticks will construct a bid 4 ticks higher than the offer or an offer 4 ticks lower than the bid. If this constructed price fails the edge test, the order will not be sent.

It should be understood that the above description of the invention and specific examples, while indicating preferred embodiments of the present invention, are given by way of illustration and not limitation. Many changes and modifications within the scope of the present invention may be made without departing from the spirit thereof, and the present invention includes all such changes and modifications.

The invention claimed is:

1. A method including:

displaying, by a computing device, a graphical user interface comprising an order entry region, the order entry region comprising a plurality of locations for receiving commands to send a trade order to buy or sell a tradeable object at an electronic exchange, each location corresponding to a price level of a plurality of price levels, wherein the price level associated with each location dynamically changes based on market data being received from the electronic exchange;

defining, by the computing device, a reference price level for order placement of trade orders to buy or sell the tradeable object;

detecting, by the computing device, an initiation of placement of a trade order relating to the tradeable object at a price through a selection by a user input device of a location corresponding to the price level in the order entry region;

determining, by the computing device, a selected price corresponding to the selected location when the selection is received;

comparing, by the computing device, the selected price of the trade order to buy or sell the tradeable object to an acceptable price range, wherein the acceptable price range is based on the reference price level and an offset parameter;

initiating, by the computing device, submission of the trade order to the electronic exchange when the price of the order is within the acceptable price range; and preventing, by the computing device, initiating submission of the trade order to the electronic exchange when the price of the trade order is outside the acceptable price range.

2. The method of claim 1, wherein the reference price level is based on the last traded price.

3. The method of claim 1, wherein the reference price level is based on a theoretical price.

4. The method of claim 1, further comprising:
defining the offset parameter.

5. The method of claim 1, wherein the offset parameter comprises a number of ticks away from the reference price level.

6. The method of claim 1, wherein a boundary of the acceptable price range is defined by adding the offset parameter to the reference price level.

7. The method of claim 1, wherein a boundary of the acceptable price range is defined by subtracting the offset parameter from the reference price level.

8. The method of claim 1, wherein the acceptable price range comprises price levels between a boundary price level and the reference price level, wherein the boundary price level is based on the offset parameter and the reference price level.

9. The method of claim 1, wherein the acceptable price range comprises price levels between a first boundary price level and a second boundary price level, wherein the first boundary price level is computed by adding the offset parameter to the reference price level, and wherein the second boundary price level is computed by subtracting the offset parameter from the reference price level.

10. The method of claim 1, wherein initiating submission of the trade order comprises transmitting the trade order to the electronic exchange.

11. The method of claim 1, further comprising:
preventing the trade order from being sent to the electronic exchange when the price of the trade order is outside the acceptable price range.

12. A computer readable medium having stored thereon instructions for execution by a processor, wherein the instructions are executable to:
display a graphical user interface comprising an order entry region, the order entry region comprising a plurality of locations for receiving commands to send a trade order to buy or sell a tradeable object at an electronic exchange, each location corresponding to a price level of a plurality of price levels, wherein the price level associated with each location dynamically changes based on market data being received from the electronic exchange;
define a reference price level for order placement of trade orders to buy or sell the tradeable object;
detect an initiation of placement of a trade order relating to the tradeable object at a price through a selection by a user input device of a location corresponding to the price level in the order entry region;
determine a selected price corresponding to the selected location when the selection is received;
compare the selected price of the trade order to buy or sell the tradeable object to an acceptable price range, wherein the acceptable price range is based on the reference price level and an offset parameter;
initiate submission of the trade order to the electronic exchange when the price of the order is within the acceptable price range; and
prevent initiation of submission of the trade order to the electronic exchange when the price of the order is outside the acceptable price range.

13. The computer readable medium of claim 12, wherein the reference price level is based on the last traded price.

14. The computer readable medium of claim 12, wherein the reference price level is based on a theoretical price.

15. The computer readable medium of claim 12, wherein the instructions are further executable to:
define the offset parameter.

16. The computer readable medium of claim 12, wherein the offset parameter comprises a number of ticks away from the reference price level.

17. The computer readable medium of claim 12, wherein a boundary of the acceptable price range is defined by adding the offset parameter to the reference price level.

18. The computer readable medium of claim 12, wherein a boundary of the acceptable price range is defined by subtracting the offset parameter from the reference price level.

19. The computer readable medium of claim 12, wherein the acceptable price range comprises price levels between a boundary price level and the reference price level, wherein the boundary price level is based on the offset parameter and the reference price level.

20. The computer readable medium of claim 12, wherein the acceptable price range comprises price levels between a first boundary price level and a second boundary price level, wherein the first boundary price level is computed by adding the offset parameter to the reference price level, and wherein the second boundary price level is computed by subtracting the offset parameter from the reference price level.

21. The computer readable medium of claim 12, wherein initiating submission of the trade order comprises transmitting the trade order to the electronic exchange.

22. The computer readable medium of claim 12, wherein the instructions are further executable to:
prevent the trade order from being sent to the electronic exchange when the price of the trade order is outside the acceptable price range.

* * * * *